(12) United States Patent
Toyoda et al.

(10) Patent No.: US 9,321,928 B2
(45) Date of Patent: *Apr. 26, 2016

(54) METAL POWDER, ULTRAVIOLET RAY CURABLE INK JET COMPOSITION AND RECORDED OBJECT

(75) Inventors: Naoyuki Toyoda, Nagano (JP); Masaya Shibatani, Nagano (JP); Hidekazu Moriyama, Nagano (JP); Minoru Yamada, Nagano (JP); Taketoshi Kagose, Toyama (JP); Toshiyuki Kobayashi, Nagano (JP); Tomohiro Ogawa, Nagano (JP); Masaru Terada, Nagano (JP); Homare Kuribayashi, Nagano (JP); Koki Hirata, Nagano (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/472,876

(22) Filed: May 16, 2012

(65) Prior Publication Data

US 2012/0295082 A1 Nov. 22, 2012

(30) Foreign Application Priority Data

May 17, 2011 (JP) ................................. 2011-110521
Feb. 1, 2012 (JP) ................................. 2012-020358

(51) Int. Cl.
| C09D 11/101 | (2014.01) |
| C09D 11/30 | (2014.01) |
| B22F 1/00 | (2006.01) |
| C09D 11/322 | (2014.01) |
| C09D 11/107 | (2014.01) |

(52) U.S. Cl.
CPC .............. *C09D 11/30* (2013.01); *B22F 1/0062* (2013.01); *C09D 11/101* (2013.01); *C09D 11/107* (2013.01); *C09D 11/322* (2013.01); *B22F 2999/00* (2013.01); *Y10T 428/24901* (2015.01); *Y10T 428/24909* (2015.01)

(58) Field of Classification Search
CPC .............. B22F 2999/00; B22F 1/0018; B22F 2304/056; B22F 1/0062; B32B 5/16; C09D 11/101; C09D 11/322; Y10T 428/24909
USPC .................... 428/403, 208; 106/503; 347/102; 977/773, 810
See application file for complete search history.

(56) References Cited

U.S. PATENT DOCUMENTS

| 5,242,624 | A | 9/1993 | Malatesta et al. |
| 6,287,695 | B1 * | 9/2001 | Kaupp et al. ................... 428/403 |
| 6,340,723 | B1 * | 1/2002 | Nitta et al. ...................... 524/430 |
| 8,088,486 | B2 | 1/2012 | Toyoda et al. |
| 2002/0096087 | A1 | 7/2002 | Glausch |
| 2003/0199655 | A1 | 10/2003 | Yurugi et al. |
| 2004/0024078 | A1 | 2/2004 | Itoh et al. |
| 2004/0214945 | A1 | 10/2004 | Uozumi |
| 2006/0000389 | A1 | 1/2006 | Duguet et al. |
| 2006/0063004 | A1 | 3/2006 | Takano et al. |
| 2006/0211788 | A1 | 9/2006 | Krohn |
| 2008/0081124 | A1 | 4/2008 | Sano et al. |
| 2008/0081864 | A1 | 4/2008 | Takano |
| 2008/0216706 | A1 | 9/2008 | Ikeya et al. |
| 2008/0238998 | A1 | 10/2008 | Nakazawa et al. |
| 2009/0075036 | A1 | 3/2009 | Itano et al. |
| 2009/0110827 | A1 | 4/2009 | Nakano et al. |
| 2009/0208651 | A1 | 8/2009 | Oyanagi et al. |
| 2009/0220695 | A1 * | 9/2009 | Oyanagi et al. ................ 427/256 |
| 2009/0280302 | A1 | 11/2009 | Fukumoto et al. |
| 2010/0026751 | A1 | 2/2010 | Oyanagi |
| 2010/0075119 | A1 | 3/2010 | Ohnishi |
| 2010/0183809 | A1 | 7/2010 | Oyanagi et al. |
| 2010/0279083 | A1 | 11/2010 | Trummer et al. |
| 2010/0330296 | A1 | 12/2010 | Loccufier et al. |
| 2011/0008613 | A1 | 1/2011 | Takano et al. |
| 2011/0014440 | A1 | 1/2011 | Itano et al. |
| 2012/0295076 | A1 | 11/2012 | Toyoda et al. |
| 2012/0295082 | A1 | 11/2012 | Toyoda et al. |

FOREIGN PATENT DOCUMENTS

| EP | 0633297 A1 | 1/1995 |
| JP | 58-168663 | 10/1983 |
| JP | 59-172140 | 9/1984 |
| JP | 06-192610 | 7/1994 |
| JP | 09-059701 | 3/1997 |
| JP | 10-219150 | 8/1998 |
| JP | 2001-106937 | * 4/2001 |
| JP | 2001-164150 | * 6/2001 |
| JP | 2001-164150 A | 6/2001 |
| JP | 2001-192618 | 7/2001 |
| JP | 2001-192618 A | 7/2001 |
| JP | 2002-194247 A | 7/2002 |
| JP | 2003-012964 A | 1/2003 |
| JP | 2005-272568 A | 10/2005 |
| JP | 2006-501345 A | 1/2006 |
| JP | 2006-169393 A | 6/2006 |
| JP | 2008-088228 A | 4/2008 |
| JP | 2009-057548 | 3/2009 |
| JP | 2009-091550 A | 4/2009 |
| JP | 2009-215411 A | 9/2009 |
| JP | 2010-018730 A | 1/2010 |

(Continued)

*Primary Examiner* — Leszek Kiliman
(74) *Attorney, Agent, or Firm* — Harness, Dickey & Pierce, P.L.C.

(57) ABSTRACT

The invention provides metal powder constituted from metal particles. Each of the metal particles comprises a base particle having a surface and a metal material constituting at least the surface of the base particle. The base particle is subjected to a surface treatment with a fluorine type phosphoric acid ester. Further, the invention also provides an ultraviolet ray curable ink jet composition to be ejected by using an ink jet method. The ultraviolet ray curable ink jet composition comprises a polymerizable compound and metal powder constituted from metal particles. The metal particles of the metal powder are subjected to a surface treatment with a fluorine type phosphoric acid ester.

9 Claims, No Drawings

(56) References Cited

FOREIGN PATENT DOCUMENTS

| | | |
|---|---|---|
| JP | 2010-030139 A | 2/2010 |
| JP | 2010-077228 A | 4/2010 |
| JP | 2010-242037 A | 10/2010 |
| JP | 2011-012253 A | 1/2011 |
| JP | 2011-046115 A | 3/2011 |
| JP | 2011-508030 A | 3/2011 |
| JP | 2011-137083 A | 7/2011 |
| WO | WO-2004-031304 A1 | 4/2004 |
| WO | WO-2005-007755 A1 | 1/2005 |
| WO | WO-2011-080973 A1 | 7/2011 |

* cited by examiner

METAL POWDER, ULTRAVIOLET RAY CURABLE INK JET COMPOSITION AND RECORDED OBJECT

CROSS-REFERENCE TO RELATED APPLICATIONS

This application is based on and claims priorities from Japanese Patent Application Nos. 2011-110521 filed on May 17, 2011 and 2012-020358 filed on Feb. 1, 2012 which are incorporated herein by reference in their entireties.

BACKGROUND

1. Technical Field

The present invention relates to metal powder, an ultraviolet ray curable ink jet composition and a recorded object.

2. Related Art

Conventionally, as a method of manufacturing a trinket showing an appearance having gloss, used is a metal plating method, a metal foil press printing method using a metal foil, a thermal transfer method using a metal foil or the like.

However, there are problems in that a printed portion having a fine pattern is hardly to be formed by using such methods or such methods are difficult to be used with respect to a curved surface portion of the trinket.

Generally, used is a coating material containing metal powder in these methods (for example, Patent document 1). Such a coating material can solve or relieve the problems as described above. However, there are problems in that a metal material cannot give high gloss and expensive-looking to be inherently exhibited to a trinket. It is considered that this is because the trinket is easily affected by oxidation and the like by producing the trinket in a state of powder which is constituted from particles of the metal material having a large specific surface area.

On the other hand, as a method of applying a composition containing a pigment or a dye onto a recording medium (object), used is a method of applying the composition using an ink jet method. The ink jet method has such advantages as to be able to form a printed portion having a fine pattern or reliably apply the composition with respect to a curved surface portion of the object. Further, in order to further improve wear resistance, water resistance, solvent resistance and the like of the printed portion, recently, a composition (ultraviolet ray curable ink jet composition) to be cured by irradiating ultraviolet ray is used in the ink jet method (for example, Patent document 2).

However, in the case where metal powder is used instead of the pigment or the dye in the ultraviolet ray curable ink jet composition, there is a problem in that the metal cannot give sufficient characteristics such as gloss to be inherently exhibited by the object. Further, the composition is inferior to the ultraviolet ray curable ink jet composition in stability (storage stability). This causes a problem in that the composition is turned into a gel, and thus ejection stability of the composition is lowered due to viscosity increase thereof.

Patent document 1: JP-A 2001-192618
Patent document 2: JP-A 2009-57548

SUMMARY

Accordingly, it is a first object of the present invention to provide metal powder which is capable of providing excellent gloss stably for a long period of time. Further, it is a second object of the present invention to provide an ultraviolet ray curable ink jet composition which has excellent storage stability and can be reliably used to produce a pattern (printed portion) having high gloss and wear resistance. Further, it is a third object of the present invention to provide metal powder which is used to produce the ultraviolet ray curable ink jet composition. Further, it is a fourth object of the present invention to provide a printed object which is formed by using the ultraviolet ray curable ink jet composition and has a pattern having high gloss and wear resistance.

These objects are achieved by the present inventions described below.

Metal powder constituted from metal particles, each of the metal particles comprising; a base particle having a surface; and a metal material constituting at least the surface of the base particle; wherein the base particle is subjected to a surface treatment with a fluorine type phosphoric acid ester.

This makes it possible to provide metal powder which is capable of providing excellent gloss stably for a long period of time.

In accordance with the metal powder of the invention, it is preferred that at least the surface of the base particle is formed from Al as a major component thereof.

Al inherently shows especially excellent gloss among various kinds of metal materials. However, in the case where Al is used as powder, there are problems in that the gloss provided inherently by Al is not sufficiently exhibited and the gloss of Al is conspicuously lowered over time by corrosion of Al. In contrast, according to the invention, even if powder constituted from metal particles of which surfaces are formed from Al is used, it is possible to reliably prevent the problems as described above from being caused. In other words, according to the invention, at least surfaces of base particles of the metal particles constituting the metal powder are mainly formed from Al. By doing so, the effects of the invention are especially remarkably exhibited.

Further, in the case where the powder constituted from the particles formed from Al is used for an ultraviolet ray curable ink jet composition, storage stability of the ultraviolet ray curable ink jet composition becomes particularly low. Further, the present inventors have found that the ultraviolet ray curable ink jet composition is turned into a gel, and therefore problems such as lowering of the ejection stability of the ultraviolet ray curable ink jet composition due to viscosity increase thereof occur more remarkably. In contrast, according to the invention, even if powder of particles of which surfaces are formed from Al is used, it is possible to reliably prevent the problems as described above from being caused. In other words, by subjecting the particles of the metal powder, of which at least the surfaces are mainly formed from Al, to a surface treatment with a fluorine type phosphoric acid ester, the effects of the invention especially remarkably can be exhibited.

In accordance with the metal powder of the invention, it is also preferred that the metal particles of the metal powder are of a scaly shape.

This makes it possible to further improve gloss and high-grade sense of a recorded object in the case where the recorded object is produced by using the metal powder (which includes a case of using a coating material containing the metal powder in addition to a case of using the metal powder by itself).

Further, it is also possible to further improve the gloss and wear resistance of a recorded object to be produced by using an ultraviolet ray curable ink jet composition.

In accordance with the metal powder of the invention, it is also preferred that the fluorine type phosphoric acid ester has a chemical structure represented by the following formula (1):

$$POR_n(OH)_{3-n} \quad (1)$$

where in the above formula (1), "R" is $CF_3(CF_2)_m$—, $CF_3(CF_2)_m(CH_2)_l$—, $CF_3(CF_2)_m(CH_2O)_l$—, $CF_3(CF_2)_m(CH_2CH_2O)_l$—, $CF_3(CF_2)_mO$— or $CF_3(CF_2)_m(CH_2)_lO$—, "n" is an integral number of 1 to 3, "m" is an integral number of 2 to 18, and "l" is an integral number of 1 to 18.

This makes it possible to improve gloss of the metal powder. Further, it is also possible to especially improve durability of the metal powder. Further, in the case where the metal powder is used for a coating material, it is possible to lower a viscosity of the coating material, thereby providing excellent coating property of the coating material.

In accordance with the metal powder of the invention, it is also preferred that the "m" is the integral number of 5 to 17, and the "l" is the integral number of 1 to 12.

This makes it possible to further improve storage stability of an ultraviolet ray curable ink jet composition in the case where the metal powder is used for the ultraviolet ray curable ink jet composition. Further, it is possible to make gloss and wear resistance of a printed portion of a printed object produced by using the ultraviolet ray curable ink jet composition especially excellent.

In accordance with the metal powder of the invention, it is also preferred that the fluorine type phosphoric acid ester is $CF_3(CF_2)_5(CH_2)_2O(P)(OH)_2$ and/or $CF_3(CF_2)_5(CH_2)_2O(P)(OH)(OCH_2CH_3)$.

This makes it possible to improve gloss of the metal powder. Further, it is also possible to especially improve durability of the metal powder. Further, in the case where the metal powder is used for a coating material, it is possible to lower a viscosity of the coating material, thereby providing excellent coating property of the coating material.

In accordance with the metal powder of the invention, it is also preferred that the fluorine type phosphoric acid ester has a perfluoro alkyl structure.

This makes it possible to improve gloss of the metal powder. Further, it is also possible to especially improve durability of the metal powder. Further, in the case where the metal powder is used for a coating material, it is possible to lower a viscosity of the coating material, thereby providing excellent coating property of the coating material.

Further, this makes it possible to further improve storage stability of an ultraviolet ray curable ink jet composition. Further, it is possible to make gloss and wear resistance of a printed portion of a printed object produced by using the ultraviolet ray curable ink jet composition especially excellent.

In accordance with the metal powder of the invention, it is also preferred that an average particle size of the metal particles of the metal powder is in a range of 500 nm to 3.0 μm.

This makes it possible to improve gloss of the metal powder. Further, it is also possible to especially improve durability of the metal powder. Further, in the case where the metal powder is used for a coating material, it is possible to provide excellent coating property of the coating material.

In accordance with the metal powder of the invention, it is also preferred that an average particle size of the metal particles is in a range of 500 nm to 2.0 μm.

This makes it possible to further improve gloss and high-grade sense of a printed object produced by using an ultraviolet ray curable ink jet composition in the case where the metal powder is used for the ultraviolet ray curable ink jet composition. Further, it is possible to make storage stability and ejection stability of the ultraviolet ray curable ink jet composition especially excellent.

In accordance with the metal powder of the invention, it is also preferred that an average thickness of the metal particles of the metal powder is in a range of 10 to 70 nm.

This makes it possible to provide especially excellent smoothness of a coating film in the case where the coating film is formed by using a coating material containing the metal powder, to thereby provide excellent gloss of the coating film. Further, it is possible to reliably prevent the metal particles of the metal powder from being deformed involuntarily during the production of a paste and the coating material while producing the metal powder with good productivity.

In accordance with the metal powder of the invention, it is also preferred that the metal powder is used to produce an ultraviolet ray curable ink jet composition to be ejected by using an ink jet method.

This makes it possible to provide the metal powder for an ultraviolet ray curable ink jet composition which has excellent storage stability and can be reliably used for producing an printed object provided with a pattern (printed portion) having high gloss and wear resistance.

An ultraviolet ray curable ink jet composition to be ejected by using an ink jet method, comprising: a polymerizable compound; and metal powder constituted from metal particles; wherein the metal particles of the metal powder are subjected to a surface treatment with a fluorine type phosphoric acid ester.

This makes it possible to provide an ultraviolet ray curable ink jet composition which has excellent storage stability and can be reliably used for producing a printed object provided with a pattern (printed portion) having high gloss and wear resistance.

In accordance with the ultraviolet ray curable ink jet composition of the invention, it is preferred that the polymerizable compound contains phenoxy ethyl acrylate.

In this case, it is possible to especially improve storage stability and ejection stability of the ultraviolet ray curable ink jet composition, and to make reactivity of the ultraviolet ray curable ink jet composition ejected by an ink jet method more excellent. This makes it possible to further improve productivity of a printed object and wear resistance and the like of a pattern to be formed.

In accordance with the ultraviolet ray curable ink jet composition of the invention, it is also preferred that the polymerizable compound contains at least one selected from the group consisting of ethyl 2-(2-hydroxy ethoxy)acrylate, dipropylene glycol diacrylate, tripropylene glycol diacrylate and 4-hydroxy butyl acrylate in addition to the phenoxy ethyl acrylate.

In this case, it is possible to especially improve storage stability and ejection stability of the ultraviolet ray curable ink jet composition, and to make reactivity of the ultraviolet ray curable ink jet composition ejected by an ink jet method more excellent. This makes it possible to further improve productivity of a printed object and the wear resistance and the like of a pattern to be formed.

In accordance with the ultraviolet ray curable ink jet composition of the invention, it is also preferred that the polymerizable compound contains dimethylol tricyclodecane diacrylate and/or amino acrylate.

In this case, it is possible to especially improve storage stability and ejection stability of the ultraviolet ray curable ink jet composition and wear resistance and the like of a pattern to be formed.

A recorded object produced by applying the ultraviolet ray curable ink jet composition described above onto an object, and then irradiating the ultraviolet ray curable ink jet composition with an ultraviolet ray.

This makes it possible to provide a recorded object having a pattern (printed portion) with high gloss and wear resistance.

DESCRIPTION OF EXEMPLARY EMBODIMENT

Hereinbelow, preferred embodiments of the invention will be described in detail.

Metal Powder

Metal powder of the invention described below in detail may be treated as powder of a drying state. However, the metal powder, generally, is treated in a state of a dispersion liquid in which the metal powder is dispersed into a dispersion medium from points of views of safety and ease of distribution. Such a dispersion liquid may be used as a paste and a coating material as it is, which will be described later in detail. Further, such a dispersion liquid may be used as a paste and a coating material by diluting with other dispersion medium components or substituting with other dispersion medium components.

The Metal powder of the invention is constituted from metal particles. Such metal particles include base particles of which at least surfaces are constituted of a metal material. The base particles are subjected to a surface treatment with a fluorine type phosphoric acid ester (hereinafter, referred to as "metal particles"). By such a configuration, the metal particles show excellent gloss stably for a long period of time. Further, by such a configuration, in the case where the metal powder is used for a coating material, it is possible to lower a viscosity of the coating material and especially improve coating property of the coating material.

Base Particles

First, the base particles constituting the metal particles (that is, particles to be subjected to the surface treatment with the fluorine type phosphoric acid ester) will be described.

In each of the base particles constituting the metal particles of the metal powder, a region including at least the vicinity of a surface thereof may be constituted of a metal material. For example, the entirety of each of the base particles may be constituted of the metal material, or each of the base particles may include a base portion formed from a non-metal material and a coat covering the base portion and formed from the metal material.

Further, as the metal material for constituting the base particles, a metal as an element, various kinds of alloys or the like can be used. In particular, even if the metal material is not constituted of a noble metal material having high chemical stability such as Pt, it is possible to sufficiently improve gloss and durability (excellent gloss-keeping performance for a long period of time) as the whole of the metal powder. This makes it possible to broaden options of materials, thereby enabling various color tones having the excellent gloss to be exhibited.

In particular, it is preferred that at least the vicinity of the surface of the base particle is formed from Al as a major component thereof in the invention. Al inherently shows especially excellent gloss among various kinds of metal materials. However, in the case where Al are used as powder, there are problems in that the gloss provided inherently by Al is not sufficiently exhibited and the gloss of Al is conspicuously lowered over time due to corrosion of Al. In contrast, according to the invention, even if powder of the base particles of which surfaces are formed from Al is used, it is possible to reliably prevent the problems as described above from being caused. Further, in the case where the powder constituted from the base particles of which surfaces are formed from Al is mixed with other components to obtain a coating material, there are problems in that a viscosity of the coating material tends to become high with ease and therefore the viscosity increases with ease over time. In contrast, according to the invention, even if the powder of the metal particles of which surfaces are formed from Al is used, it is possible to reliably prevent the problems as described above from caused. In other words, according to the invention, at least the surfaces of the base particles constituting the metal particles of the metal powder are formed from Al as a major component thereof. By doing so, the effects of the invention are especially remarkably exhibited.

Further, the base particles may be produced by using any methods. In the case where at least the surfaces of the base particles are formed from Al, it is preferred that they are produced by forming a film made of Al on the particle by using a vapor phase film formation method, and then crushing the film. This makes it possible to more effectively express the gloss and the like which Al inherently has. Further, this also makes it possible to suppress variation among the base particles in property. Furthermore, by using such a method, it is possible to appropriately produce even relatively fine base particles.

In the case where the base particles are produced by using such a method, for example, by forming (film-forming) the film made of Al onto a base material (base), it is possible to appropriately produce the base particles. As the base material, for example, a plastic film such as polyethylene terephthalate can be used. Further, the base material may have a release agent layer provided on a film-formation surface thereof.

Furthermore, it is preferred that the crushing is carried out by subjecting the film to ultrasonic vibration in a liquid. This makes it possible to easily and reliably obtain the base particles having the particle size as described above and to suppress variation of the particles in a size, a shape and property from occurring.

In the case where the crushing is carried out in the method as mentioned above, it is preferable to use as the liquid: alcohols such as methanol, ethanol, propanol and butanol; hydrocarbon-based compounds such as n-heptane, n-octane, decane, dodecane, tetradecane, toluene, xylene, cymene, durene, indene, dipentene, tetrahydro naphthalene, decahydro naphthalene and cyclohexyl benzene; ether-based compounds such as ethylene glycol dimethyl ether, ethylene glycol diethyl ether, ethylene glycol methyl ethyl ether, diethylene glycol dimethyl ether, diethylene glycol diethyl ether, diethylene glycol methyl ethyl ether, diethylene glycol monobutyl ether acetate, diethylene glycol n-butyl ether, tripropylene glycol dimethyl ether, triethylene glycol diethyl ether, 1,2-dimethoxy ethane, bis(2-methoxy ethyl)ether and p-dioxane; polar compounds such as propylene carbonate, γ-butyrolactone, N-methyl-2-pyrrolidone, N,N-dimethyl formamide (DMF), N,N-dimethyl acetamide (DMA), dimethyl sulfoxide, cyclohexanone and acetonitrile; and the like. By using such a liquid, it is possible to prevent undesirable oxidation and the like of the Al film of the base particles and to further improve productivities of the base particles and the metal powder. Further, it is also possible to make variation among the base particles in a size, a shape and property smaller.

Fluorine Type Phosphoric Acid Ester

As described above, the metal powder according to the invention is one that the base particles are subjected to the surface treatment with the fluorine type phosphoric acid ester.

As the fluorine type phosphoric acid ester, a phosphoric acid ester having at least one fluorine atom in a molecule thereof can be used.

In particular, it is preferred that the fluorine type phosphoric acid ester is a compound having a chemical structure represented by the following formula (1).

$$POR_n(OH)_{3-n} \quad (1)$$

where in the above formula (1), "R" is $CF_3(CF_2)_m-$, $CF_3(CF_2)_m(CH_2)_l-$, $CF_3(CF_2)_m(CH_2O)_l-$, $CF_3(CF_2)_m(CH_2CH_2O)_l-$, $CF_3(CF_2)_mO-$ or $CF_3(CF_2)_m(CH_2)_lO-$, "n" is an integral number of 1 to 3, "m" is an integral number of 5 to 17, and "l" is an integral number of 1 to 12.

This makes it possible to improve the gloss of the metal powder. Further, it is also possible to especially improve the durability of the metal particles of the metal powder. Further, in the case where the metal powder is used for a coating material, it is possible to lower a viscosity of the coating material, thereby providing excellent coating property of the coating material.

In the above formula (1), "m" is preferably the integral number of 5 to 17, and more preferably the integral number of 4 to 12. This makes it possible to more remarkably exhibit the above mentioned effects.

Further, in the above formula (1), "l" is preferably the integral number of 1 to 12, and more preferably the integral number of 1 to 10. This makes it possible to more remarkably exhibit the above mentioned effects.

Further, it is preferred that the fluorine type phosphoric acid ester is $CF_3(CF_2)_5(CF_2)_2O(P)(OH)_2$ and/or $CF_3(CF_2)_5(CH_2)_2O(P)(OH)(OCH_2CH_3)$. This makes it possible to improve the gloss of the metal powder. Further, it is also possible to especially improve the durability of the metal particles of the metal powder. Further, in the case where the metal powder is used for the coating material, it is possible to lower a viscosity of the coating material, thereby providing the excellent coating property of the coating material.

Further, it is preferred that the fluorine type phosphoric acid ester has a perfluoro alkyl structure ($C_nF_{2n+1}$). This makes it possible to make the gloss of the metal powder more excellent. Further, it is also possible to especially improve the durability of the metal particles of the metal powder. Further, in the case where the metal powder is used for the coating material, it is possible to lower a viscosity of the coating material, thereby providing the excellent coating property of the coating material.

The base particles may be directly subjected to the surface treatment with the fluorine type phosphoric acid ester as described above, but may be preferably subjected to a treatment with an acid or a base, and then the subjected base particles may be preferably subjected a treatment with the above fluorine type phosphoric acid ester. This makes it possible to reliably modify the surfaces of the base particles with the above fluorine type phosphoric acid ester due to a chemical bonding thereof, to thereby exhibit the above mentioned effects of the invention in a more effective manner. Further, even if an oxide film is formed on the surfaces of particles to become the base particles (base material) before the base particles are subjected to the surface treatment with the fluorine type phosphoric acid ester, it is possible to reliably remove the oxide film. Furthermore, it is possible to be subjected to the surface treatment with the fluorine type phosphoric acid ester in a state that the oxide film is removed.

Therefore, it is possible to especially improve the gloss of the metal powder to be produced. Examples of the acid include a proton acid such as hydrochloric acid, sulfuric acid, phosphoric acid, nitric acid, boric acid, acetic acid, carbonic acid, formic acid, benzoic acid, chlorous acid, hypochlorous acid, sulfurous acid, hyposulfurous acid, nitrous acid, hyponitrous acid, phosphorous acid, hypophosphorous acid and the like. Among them, it is preferably hydrochloric acid, phosphoric acid and acetic acid. On the other hand, examples of the base include sodium hydroxide, potassium hydroxide, calcium hydroxide and the like. Among them, it is preferably sodium hydroxide and potassium hydroxide. Each of the metal particles of the metal powder may be of any shape such as a spherical shape, a fusiform shape or a needle shape, but is preferably of a scaly shape. This makes it possible to make the gloss and the high-grade sense of a recorded object especially excellent in the case where the recorded object is produced by using the metal powder (which includes a case of using a coating material containing the metal powder in addition to a case of using the metal powder by itself).

In the invention, the scaly shape means a shape in which an area of the metal particle observed from a predetermined direction (that is, an area of each metal particle at a planar view thereof) is larger than an area of the metal particle observed from a direction orthogonal to the above observation direction, such as a plate shape or a curved plate shape. In particular, in the case where an area of the metal particle observed from a direction where a project area thereof becomes maximum (that is, an area of each metal particle at a planar view thereof) is defined as $S_1$ ($\mu m^2$) and an area of the metal particle observed from a direction where the area of the metal particle observed from directions orthogonal to the above observation direction becomes maximum is defined as $S_0$ ($\mu m^2$), especially, a ratio of $S_1$ to $S_0$ ($S_1/S_0$) is preferably 2 or more, more preferably 5 or more, and even more preferably 8 or more. For example, as the value of this ratio, an average value of the values of the ratios obtained by observing arbitrary 10 metal particles can be used.

An average particle size of the metal particles of the metal powder is preferably in the range of 500 nm to 3.0 µm, and more preferably in the range of 800 nm to 1.8 µm. This makes it possible to further improve the gloss of the metal powder. Further, this also makes it possible to further improve the durability of the metal particles of the metal powder. Furthermore, in the case where the metal powder is used for the metal material, it is possible to further improve the coating property of the coating material.

An average thickness of the metal particles of the metal powder is preferably in the range of 10 to 70 nm. This makes it possible to provide especially excellent smoothness of a coating film in the case where the coating film is formed by using the coating material containing the metal powder, to thereby provide excellent gloss of the coating material. Furthermore, it is possible to reliably prevent the metal particles of the metal powder from being deformed involuntarily during the production of a paste and the coating material while producing the metal powder with good productivity. In contrast, if the average thickness of the metal particles of the metal powder is smaller than the lower limit value noted above, it becomes easy for the metal particles of the metal powder to deform involuntarily during the production of the paste or the coating material. Further, if the average thickness of the metal particles of the metal powder exceeds the upper limit value noted above, energy to be needed for the crushing becomes large during the production of the metal powder, so that it becomes difficult to provide the excellent productivity of the metal powder. This is not preferable from a point of view of energy saving. Further, if the average thickness of the metal particles of the metal powder exceeds the upper limit value noted above, in the case the coating film is formed by using the coating material containing the metal powder, it becomes difficult to sufficiently improve the smoothness of the coating film, so that it becomes difficult to sufficiently improve the gloss of the coating film.

The metal powder of the invention as described above may be used for any applications, but for example, can be used for various kinds of coating material such as a paste for preparing the coating material and/or an ink, a powder coating material and the like.

Hereinafter, a description will be made on a paste and a coating material in detail.

Paste

The metal powder of the invention as described above can be used for preparing the paste.

Such a paste, for example, can be used for preparing the coating material and an ink.

The paste, for example, can be obtained by mixing the metal powder of the invention as described above with an organic solvent to obtain a slurry and then concentrating the slurry.

Examples of the organic solvent include: a hydrocarbon based solvent such as a mineral spirit, a solvent naphtha and toluene; a solvent having a low viscosity such as an alcohol based solvent, an ether based solvent, a keton based solvent, an ester based solvent and a glycol based solvent; and the like. From points of views of general-purpose properties and safeness, it is preferred that the mineral spirit is used.

Further, the paste may contain a grinding aid, a lubricant agent or their modified materials. Examples of the grinding aid include: a higher fatty acid such as oleic acid and stearic acid; a higher aliphatic amine such as stearyl amine; a higher aliphatic alcohol; and the like.

If the paste is prepared so that an amount of aluminum is 15 wt % or less, it is easy to handle the paste.

The concentration as described above, for example, is carried out by using an apparatus of performing filtration continuously (e.g. a dram filter, a belt filter or a disc filter), a centrifugal setting apparatus and the like. The centrifugal setting apparatus is an apparatus that aluminum pigment particles in a slurry are centrifugally settled out by rotating a imperforate rotary bowl at a high speed. Examples of such a centrifugal setting apparatus include a separating plate-type centrifugal setting apparatus, a decanter-type centrifugal setting apparatus and the like.

Coating Material

Further, the metal powder of the invention as described above can be used for preparing the coating material.

Examples of such a coating material include a powder coating material, a solvent-type coating material (a coating material containing a solvent), a water-based coating material (a coating material containing water) and the like.

The coating material of the invention may contain, for example, a binder in addition to the metal powder of the invention as described above. This makes it possible to improve strength of a coating film obtained by using the coating material and adhesion of the coating material to an adherend.

Examples of such a binder include an acrylic resin, a polyester resin, an alkyd resin, an epoxy resin, a fluorine resin, a lacquer cured by natural drying, a two-pack polyurethane resin, a silicone resin and the like.

Further, in the case where the coating material of the invention contains the solvent (a case of a solvent-type coating material), examples of such a solvent include: an aliphatic hydrocarbon based solvent such as hexane, heptane, cyclohexane and octane; an aromatic hydrocarbon based solvent such as benzene, toluene and xylene; a mixing solvent of an aliphatic hydrocarbon such as a mineral spirit and an aromatic hydrocarbon; a halogenated hydrocarbon based solvent such as chlorobenzene, trichlorobenzene, perchloroethylene and trichloroethylene; alcohols such as methanol, ethanol, n-propyl alcohol and n-butanol; ketones such as n-propanone and 2-butanone; esters such as ethyl acetate and propyl acetate; ethers such as tetrahydrofuran, diethyl ether and ethyl propyl ether; and the like.

Further, the coating material of the invention may contain other pigments in addition to the metal powder of the invention. This makes it possible to express various color tones which cannot be obtained by using the metal powder by itself.

Examples of such pigments include phthalocyanine, halogenated phthalocyanine, quinacridone, diketo-pyrrolopyrrole, iso-indolinone, an azomethine metal complex, indanthrone, perylene, perynone, anthraquinone, dioxazine, benzo-imidazolone, a condensation azo, triphenylmethane, quinophthalone, anthrapyrimidine, titanium oxide, ferric oxid, chinese white (zinc oxide), a cobalt blue, an ultramarine blue, a chrome yellow, a carbon black, a pearl mica and the like.

Further, the coating material of the invention may contain other components. Examples of such components include a dispersant, a curing agent, an ultraviolet absorbing agent, an electrostatic remover, a thickner, a coupling agent, a plasticizer, an antioxidant agent, a glazing agent, a synthetic preserving agent, a lubricant agent, a filler, a dye, an anti-sagging agent, a viscoelastic improving agent and the like.

Furthermore, in the case where the coating material of the invention is the powder coating material, the powder coating material contains powder constituted from particles of a thermoplastic resin (thermoplastic resin powder) and powder constituted from particles of a thermosetting resin (thermosetting resin powder) in addition to the metal powder of the invention as described above. Among them, it is preferred that the powder coating material contains the thermosetting resin powder from points of views of the strength, the durability and the appearance of the coating film formed by using the coating material.

Examples of the thermosetting resin powder include powder of a composition (resin composition) which contains the thermosetting resin such as an acrylic resin and a polyester resin. Further, the thermosetting resin powder used for the powder coating material may contain a curing agent, a dispersant and the like as necessary.

Examples of the curing agent include an amine, a polyamide, dicyandiamides, imidazoles, carboxylic acid dihydrazide, an acid anhydride, a polysulfide, boron trifluoride, an amino resin, triglycidyl isocyanate, primidone, an epoxy resin, other diacid bases, imidazolines, hydrazides, an isocyanate compound and the like. Furthermore, these curing agents can be used with a hardening accelerator in combination as necessary.

Examples of the dispersant include a surfactant such as phophoesters, amines, polyoxy ethylene alkylether and polyoxy ethylene alkylphenylether.

Furthermore, the following compounds other than above compounds may be added in the thermosetting resin as necessary. Examples of such compounds include: various kinds of filler such as calcium carbonate, barium sulfate and a talc; various kinds of liquidity modifier such as silica, alumina and aluminum hydroxide; various kinds of coloring agent such as titanium oxide, a carbon black, ferric oxide, cupper phthalocyanine, an azo pigment and a condensataion-polycyclic pigment; various kinds of additive such as waxs, coupling agents, an antioxidant and magnetic powder; and various kinds of functional material.

An average particle size of the particles of the thermosetting resin powder is not particularly limited, but is preferably in the range of 5 to 100 µm, and more preferably 15 to 60 µm. If the average particle size is smaller than the lower limit noted above, it becomes difficult to make dust uniformly at the time of performing powder coating. Further, there is a possibility that it becomes difficult to sufficiently improve the smoothness of the coating film because globs of the thermosetting resin of the particles add to a coating plate. On the other hand, if the average particle size exceeds the upper limit noted above, there is a possibility that the smoothness of the coating film is lowered, so that an aesthetic aspect (sensuousness) of the coating film is lowered.

Further, in the powder coating material, an amount of the metal powder of the invention is preferably in the range of 1 to 30 parts by weight and more preferably in the range of 2 to 20 parts by weight with respect to 100 parts by weight of the thermosetting resin powder. If the amount of the metal powder is smaller than the lower limit noted above, the gloss (metallic sense and brightness sense) tends to be lowered conspicuously, so that the coating film having a large thickness tends to be able to be made in order to cover the base material. On the other hand, if the amount of the metal powder exceeds the upper limit noted above, there is a possibility that the smoothness of the coating film is lowered, so that the aesthetic aspect (sensuousness) of the coating film is lowered.

It is preferred that a method of coating the powder coating material of the invention uses a method in which a surface of a coated object is subjected to a blast treatment in advance, and then is subjected to a well-known treatment of a chemical conversion treatment and the like, thereafter the powder coating material is allowed to adhere to the surface of the coated object, and then the powder coating material is heat-cured.

The coated object (base material) is not particularly limited, but is preferably one which does not deform due to printing and generate alterant and the like. Examples of the coated object include: an elemental metal such as iron, cupper, aluminum and titanium which are well-known; various kinds of alloy; and the like. Concrete examples of materials include an auto body, office articles, house articles, sport gears, architectural materials, electrical products and the like.

A flow dipping method and an electrostatic powder coating method are used as a method of allowing the powder coating material of the invention to adhere to the surface of the base material. Among them, the electrostatic powder coating method is preferable to exhibit excellent coating efficiency. Examples of the electrostatic powder coating method include a corona discharge type method, a frictional electrification type method and the like.

Although a heating temperature is appropriately set depending on a kind of thermosetting resin powder to be used, the heating temperature is preferably 120° C. or higher and more preferably in the range of 150 to 230° C. A heating time is preferably 1 minute or more and more preferably in the range of 5 to 30 minutes. A thickness of the coating film formed by the heat is preferably in the range of 20 to 100 µm.

As described above, the preferred embodiments of the invention was described, but the invention is not limited to them.

Next, a description will be made on other preferred embodiments of the invention in detail.

Metal Powder

First, a description will be made on metal powder of the invention (powder for an ultraviolet ray curable ink jet composition). However, an explanation on the common points to the embodiments described above is omitted.

The metal powder of the invention is used to produce the ultraviolet ray curable ink jet composition which is ejected by an ink jet method.

Meanwhile, conventionally, as a method of manufacturing a trinket showing an appearance having gloss, used is a metal plating method, a metal foil press printing method using a metal foil, a thermal transfer method using a metal foil or the like.

However, there are problems in that a printed portion having a fine pattern is hardly to be formed by using such methods or such methods are difficult to be used with respect to a curved surface portion of the trinket.

On the other hand, as a method of applying a composition containing a pigment or a dye onto a recording medium (object), used is a method of applying the composition using an ink jet method. The ink jet method has such advantages as to be able to form a printed portion having a fine pattern or reliably apply the composition with respect to a curved surface portion of the object. Further, in order to further improve wear resistance, water resistance, solvent resistance and the like of the printed portion, recently, a composition (ultraviolet ray curable ink jet composition) to be cured by irradiating ultraviolet ray is used in the ink jet method.

However, in the case where metal powder is used instead of the pigment or the dye in the ultraviolet ray curable ink jet composition, there is a problem in that the metal cannot give sufficient characteristics such as the gloss to be inherently exhibited to an object. Further, the composition is inferior to the ultraviolet ray curable ink jet composition in stability (storage stability). This causes a problem in that the composition is turned into a gel, and thus ejection stability of the composition is lowered due to viscosity increase thereof.

Accordingly, the present inventors have earnestly conducted studies for purpose of solving the above problems. As a result, they have found the present invention. Namely, the metal powder of the invention is constituted from the metal particles that the base particles are subjected to the surface treatment with the fluorine type phosphoric acid ester as described above. This makes it possible to improve chemical stability and dispersion stability of the metal powder in the ultraviolet ray curable ink jet composition and make the storage stability and the ejection stability for a long period of time of the ultraviolet ray curable ink jet composition excellent. Further, in a recorded object produced by using the ultraviolet ray curable ink jet composition, it is possible to reliably arrange the metal particles of the metal powder at the vicinity of an outer surface of a printed portion, so that to efficiently exhibit characteristics such as gloss which are inherently possessed by the metal material of the metal particles constituting the metal powder. Further, by subjecting the base particles constituting the metal particles of the metal powder to the surface treatment with the fluorine type phosphoric acid ester, even if a polymerizable compound having low surface tension is used as a constituent material of the ultraviolet ray curable ink jet composition, it is possible to reliably arrange (leafing) the metal particles of the metal powder at the vicinity of the outer surface of the printed portion in the printed object produced by using the ultraviolet ray curable ink jet composition. Furthermore, it is possible to efficiently exhibit the characteristics such as the gloss which are inherently possessed by the metal material of the metal particles constituting the metal powder. Therefore, it is possible to broaden options of the polymerizable compound, and easily adjust the characteristics of the ultraviolet ray curable ink jet composition and the characteristics of the printed object produced by using the ultraviolet ray curable ink jet composition (e.g. viscosity, storage stability and ejection stability of the ultraviolet ray curable ink jet composition and wear resistance of the object) without loss of the gloss which is inherently possessed by the metal material.

Base Particles

It is preferred that at least a surface of each of base particles is formed from Al as a major component thereof. Al inherently shows especially excellent gloss among various kinds of metal materials. However, in the case where powder constituted from particles formed from Al are used in the ultraviolet ray curable ink jet composition, the present inventors have found that the storage stability of the ultraviolet ray curable ink jet composition becomes particularly low, the ultraviolet ray curable ink jet composition is turned into a gel, and therefore the problems such as lowering of the ejection stability of the ultraviolet ray curable ink jet composition due to viscosity increase thereof occur more remarkably. On the other hand, the invention reliably prevents the occurrence of the above problems even in the case where the powder constituted from the particles whose surfaces are formed from Al is used. Namely, by using the metal powder of the invention obtained by subjecting the base particles, in which at least surfaces thereof are mainly formed from Al, to the surface treatment with the fluorine type phosphoric acid ester, the effects of the invention especially remarkably can be exhibited.

Further, the base particles may be produced by using any methods as described above. In the case of the base particles formed from Al, it is preferred that they are produced by forming a film made of Al using a vapor phase film formation method, and then crushing the film. This makes it possible to more effectively express the gloss and the like which Al inherently has in a pattern (printed portion) to be formed by using the ultraviolet ray curable ink jet composition containing the metal powder of the invention. Further, this also makes it possible to suppress variation among the particles in property. Furthermore, by using such a method, it is possible to appropriately produce the metal particles each having a relatively thin thickness.

Fluorine Type Phosphoric Acid Ester

As described above, the metal particles of the metal powder are that the base particles are subjected to the surface treatment with the fluorine type phosphoric acid ester.

In particular, in the case where the metal particles are used to produce the ultraviolet ray curable ink jet composition which is ejected by the ink jet method, the fluorine type phosphoric acid ester is especially preferably a compound having a chemical structure represented by the following formula (2).

$$POR_n(OH)_{3-n} \quad (2)$$

In the above formula (2), "R" is $CF_3(CF_2)_m$—, $CF_3(CF_2)_m(CH_2)_l$—, $CF_3(CF_2)_m(CH_2O)_l$—, $CF_3(CF_2)_m(CH_2CH_2O)_l$—, $CF_3(CF_2)_mO$— or $CF_3(CF_2)_m(CH_2)_lO$—, "n" is an integral number of 1 to 3, "m" is an integral number of 2 to 18, and "l" is an integral number of 1 to 18.

This makes it possible to especially improve the storage stability of the ultraviolet ray curable ink jet composition, and to make the gloss and the wear resistance of the printed portion of the printed object produced by using the ultraviolet ray curable ink jet composition especially excellent.

In the above formula (2), "m" is preferably the integral number of 3 to 14, and more preferably the integral number of 4 to 12. This makes it possible to more remarkably exhibit the above mentioned effects.

In the above formula (2), "l" is preferably the integral number of 1 to 14, and more preferably the integral number of 1 to 10. This makes it possible to more remarkably exhibit the above mentioned effects.

Further, it is preferred that the fluorine type phosphoric acid ester has a perfluoro alkyl structure ($C_nF_{2n+1}$). This makes it possible to further improve the storage stability of the ultraviolet ray curable ink jet composition, and to make the gloss and the wear resistance of the printed portion of the printed object produced by using the ultraviolet ray curable ink jet composition more excellent.

Each of the metal particles may be of any shape such as a spherical shape, a fusiform shape or a needle shape, but is preferably of a scaly shape. This makes it possible to align the metal particles of the metal powder on an object, on which the ultraviolet ray curable ink jet composition is to be applied, so that major surfaces of the metal particles of the metal powder are oriented along a surface shape of the object. Therefore, it is also possible to more effectively exhibit the gloss and the like, which the metal material constituting the metal particles of the metal powder inherently has, in the printed object to be produced, to thereby make the gloss and the high-grade sense of the printed portion to be formed especially excellent. Further, it is also possible to further improve the water resistance of the printed portion. Furthermore, in the case where the base particles not subjected to the above mentioned surface treatment with the fluorine type phosphoric acid ester is used, if each of the base particles of the metal powder is of the scaly shape, the storage stability and the ejection stability of the ultraviolet ray curable ink jet composition are apt to be further remarkably lowered. On the other hand, in the invention, even if each of the metal particles of the metal powder is of the scaly shape, it is possible to prevent such a problem from occurring. Namely, in the case where each of the metal particles of the metal powder is of the scaly shape, the effects of the invention can be more remarkably exhibited.

In the case where the metal particles are used to produce the ultraviolet ray curable ink jet composition which is ejected by the ink jet method, an average particle size of the metal particles of the metal powder is preferably in the range of 500 nm to 2.0 μm, and more preferably in the range of 800 nm to 1.8 μm. This makes it possible to further improve the gloss and the high-grade sense of the printed object to be produced by using the ultraviolet ray curable ink jet composition. Further, this also makes it possible to make the storage stability and the ejection stability of the ultraviolet ray curable ink jet composition more excellent.

Ultraviolet Ray Curable Ink Jet Composition

Next, an ultraviolet ray curable ink jet composition of the invention will be described.

The ultraviolet ray curable ink jet composition of the invention is adapted to be ejected by using the ink jet method and includes a polymerizable compound and metal powder as described above. This makes it possible to provide the ultraviolet ray curable ink jet composition which has excellent storage stability and can be reliably used for producing the printed object provided with a pattern (printed portion) having high gloss and wear resistance.

Polymerizable Compound

A polymerizable compound is a component capable of being cured due to polymerization thereof by being irradiated with an ultraviolet ray. By containing such a component, it is possible to improve the wear resistance, the water resistance, the solvent resistance and the like of the printed object to be produced by using the ultraviolet ray curable ink jet composition.

The polymerizable compound is of a liquid state, and preferably functions as a dispersion medium capable of dispersing the metal powder in the ultraviolet ray curable ink jet composition. In this case, since another dispersion medium, which is removed (vapored) in the course of producing the printed object, have not to be used, and therefore a step of removing the dispersion medium have not to be provided in the course of producing the printed object, it becomes possible to especially improve productivity of the printed object. Further, since a dispersion medium generally utilized as an organic solvent have not to be used, it is possible to prevent a problem resulted from a volatile organic compound (VOC) from being generated. Furthermore, by containing the polymerizable compound in the ultraviolet ray curable ink jet composition, it is also possible to improve adhesion of the printed portion to be formed by using the ultraviolet ray curable ink jet composition with respect to various kinds of object (base material). Namely, by containing the polymerizable compound in the ultraviolet ray curable ink jet composition, the ultraviolet ray curable ink jet composition can exhibit excellent media responsibility.

The polymerizable compound has only to be a component capable of being polymerized by ultraviolet ray irradiation. As such a polymerizable compound, various kinds of monomers and various kinds of oligomers (including a dimmer, a trimmer and the like) can be used. Particularly, it is preferred that the ultraviolet ray curable ink jet composition contains at least a monomer component as the polymerizable compound. Since the monomer is a component having generally a viscosity lower than that of the oligomer component or the like, the use of the monomer is advantageous in that the ejection stability of the ultraviolet ray curable ink jet composition can make especially excellent.

Examples of the monomer of the polymerizable compound include isobornyl acrylate, 4-hydroxy butyl acrylate, lauryl acrylate, 2-methoxy ethyl acrylate, phenoxy ethyl acrylate, isooctyl acrylate, stearyl acrylate, cyclohexyl acrylate, 2-ethoxy ethyl acrylate, benzyl acrylate, 1H,1H,5H-octafluoro pentyl acrylate, 1H,1H,5H-octafluoro pentyl methacrylate, 2-hydroxy ethyl acrylate, 2-hydroxy propyl acrylate, isobutyl acrylate, t-butyl acrylate, tetrahydro furfuryl acrylate, ethyl carbitol acrylate, 2,2,2-trifluoro ethyl acrylate, 2,2,2-trifluoro ethyl methacrylate, 2,2,3,3-tetrafluoro propyl acrylate, methoxy triethylene glycol acrylate, PO-modified nonyl phenol acrylate, EO-modified nonyl phenol acrylate, EO-modified 2-ethyl hexyl acrylate, phenyl glycidyl ether acrylate, phenoxy diethylene glycol acrylate, EO-modified phenol acrylate, phenoxy ethyl acrylate, EO-modified cresol acrylate, methoxy polyethylene glycol acrylate, dipropylene glycol acrylate, dicyclopentenyl acrylate, dicyclopentenyl oxy ethyl acrylate, 2-n-butyl-2-ethyl-1,3-propanediol diacrylate, tripropylene glycol diacrylate, tetraethylene glycol diacrylate, 1,9-nonanediol diacrylate, 1,4-butanediol diacrylate, bisphenol A EO-modified diacrylate, 1,6-hexanediol diacrylate, polyethylene glycol 200 diacrylate, polyethylene glycol 300 diacrylate, neopentyl glycol hydroxyl pivalate diacrylate, 2-ethyl-2-butyl-propanediol diacrylate, polyethylene glycol 400 diacrylate, polyethylene glycol 600 diacrylate, polypropylene glycol diacrylate, 1,9-nonanediol diacrylate, 1,6-hexanediol diacrylate, bisphenol A EO-modified diacrylate, PO-modified bisphenol A diacrylate, EO-modified hydrogenated bisphenol A diacrylate, dipropylene glycol diacrylate, polypropylene glycol diacrylate, trimethylol propane triacrylate, pentaerythritol triacrylate, trimethylol propane EO-modified triacrylate, glycerine PO-added triacrylate, trisacryloyl oxy ethyl phosphate, pentaerythritol tetraacrylate, PO-modified trimethylol propane triacrylate, tris(acryloxy ethyl) isocyanurate, pentaerythritol triacrylate, trimethylol propane triacrylate, pentaerythritol triacrylate, 2-(2-vinyloxy ethoxy)ethyl acrylate, and the like. Among them, the 4-hydroxy butyl acrylate, the phenoxy ethyl acrylate, the dicyclopentenyl acrylate, the dicyclopentenyl oxy ethyl acrylate, the tripropylene glycol diacrylate, the tetraethylene glycol diacrylate, the dipropylene glycol diacrylate, the trimethylol propane triacrylate, the trimethylol propane EO-modified triacrylate, the pentaerythritol tetraacrylate, the pentaerythritol triacrylate or the 2-(2-vinyloxy ethoxy)ethyl acrylate is preferable.

It is especially preferred that the ultraviolet ray curable ink jet composition contains the phenoxy ethyl acrylate as the polymerizable compound. In this case, it is possible to improve the storage stability and the ejection stability of the ultraviolet ray curable ink jet composition, and to make the reactivity of the ultraviolet ray curable ink jet composition ejected by the ink jet method especially excellent. This makes it possible to further improve productivity of the printed object and the wear resistance and the like of the printed portion (pattern) to be formed.

Further, it is preferred that the ultraviolet ray curable ink jet composition contains at least one selected from the group consisting of a 2-(2-vinyloxy ethoxy)ethyl acrylate, a dipropylene glycol diacrylate, a tripropylene glycol diacrylate and a 4-hydroxy butyl acrylate as the polymerizable compound in addition to the phenoxy ethyl acrylate. In this case, it is possible to improve the storage stability and the ejection stability of the ultraviolet ray curable ink jet composition, and to make the reactivity of the ultraviolet ray curable ink jet composition ejected by the ink jet method especially excellent. This makes it possible to further improve the productivity of the printed object and the wear resistance and the like of the printed portion to be formed.

Furthermore, it is preferred that the ultraviolet ray curable ink jet composition contains a dimethylol tricyclodecane diacrylate and/or an amino acrylate as the polymerizable compound. This makes it possible to further improve the storage stability and the ejection stability of the ultraviolet ray curable ink jet composition and the wear resistance and the like of the printed portion to be formed.

Moreover, the ultraviolet ray curable ink jet composition may contain an oligomer as the polymerizable compound in addition to the monomer. It is especially preferred that the ultraviolet ray curable ink jet composition contains a polyfunctional oligomer. This makes it possible to especially improve the storage stability of the ultraviolet ray curable ink jet composition and the wear resistance and the like of the printed portion to be formed. In this regard, it is to be noted that, in the invention, a polymerizable compound having a molecular skeleton including repeating units and a molecular weight of 600 or more is referred to as "oligomer". As the oligomer, an urethane oligomer in which the repeating units are urethane units or an epoxy oligomer in which the repeating units are epoxy units can be preferably used.

Other Components

The ultraviolet ray curable ink jet composition of the invention may contain components other than the above mentioned components (that is, other components). Examples of such other components include a photo initiator, a slipping agent (leveling agent), a dispersant, a polymerization accelerator, a polymerization inhibitor, a penetration accelerator, a wetting agent (moisturizing agent), a coloring agent, a fixing agent, an antifungal agent, an antiseptic agent, an antioxidant, a chelating agent, a thickening agent, a sensitizing agent (sensitizing dye) and the like.

The photo initiator is not limited to a specific type, as long as it can generate radicals, cations and the like by being irradiated with an ultraviolet ray, and thus can start a polymerization reaction of the polymerizable compound. As the photo initiator, a photo radical initiator or a photo cation initiator can be used, but the photo radical initiator can be preferably used. In the case where the photo initiator is used, it is preferred that the photo initiator has an absorption peak within an ultraviolet region.

Examples of the photo radical initiator include aromatic ketones, an acyl phosphine oxide compound, an aromatic onium salt compound, an organic peroxide, a thiocompound (e.g., a thioxanthone compound, a thiophenyl group containing compound), a hexaaryl biimidazole compound, a ketooxime ester compound, a borate compound, an azinium compound, a metallocene compound, an activated ester compound, a compound including a carbon-halogen bond, an alkyl amine compound and the like.

From viewpoints of solubility with respect to the polymerizable compound and curing property thereof, among them, at least one selected from the group consisting of the acyl phosphine oxide compound and the thioxanthone compound is preferable, and a combination of the acyl phosphine oxide compound and the thioxanthone compound is more preferable.

Concrete examples of the photo radical initiator include acetophenone, acetophenone benzyl ketal, 1-hydroxy cyclohexyl phenyl ketone, 2,2-dimethoxy-2-phenyl acetophenone, xanthone, fluorenone, benzaldehyde, fluorene, anthraquinone, triphenylamine, carbazole, 3-methyl acetophenone, 4-chloro benzophenone, 4,4'-dimethoxy benzophenone, 4,4'-diamino benzophenone, Michler's ketone, benzoin propyl ether, benzoin ethyl ether, benzyl dimethyl ketal, 1-(4-isopropyl phenyl)-2-hydroxy-2-methylpropane-1-on, 2-hydroxy-2-methyl-1-phenyl propane-1-on, thioxanthone, diethyl thioxanthone, 2-isopropyl thioxanthone, 2-chloro thioxanthone, 2-methyl-1-[4-(methyl thio)phenyl]-2-morpholino-propane-1-on, bis(2,4,6-trimethyl benzoyl)-phenyl phosphineoxide, 2,4,6-trimethyl benzoyl-diphenyl phosphineoxide, 2,4-diethyl thioxanthone, bis(2,6-dimethoxy benzoyl)-2,4,4-trimethyl pentyl phosphineoxide, and the like, and one of them can be used alone or two or more of them can be used in combination.

An amount of the photo initiator contained in the ultraviolet ray curable ink jet composition is preferably in the range of 0.5 to 10 wt %. If the amount of the photo initiator falls within the above range, a curing rate of the ultraviolet ray curable ink jet composition by the ultraviolet ray irradiation becomes sufficiently high, and an insoluble matter of the photo initiator or coloring resulting from the photo initiator is hardly generated.

In the case where the ultraviolet ray curable ink jet composition contains the slipping agent, a surface of the printed object becomes smooth due to a leveling effect thereof. This makes it improve the wear resistance of the printed object.

The slipping agent is not limited to a specific kind. As the slipping agent, a silicone-based surface active agent such as a polyester-modified silicone or a polyether-modified silicone can be used, and polyether-modified polydimethyl siloxane or polyester-modified polydimethyl siloxane can be preferably used.

In the case where the ultraviolet ray curable ink jet composition contains the dispersant, it is possible to make dispersiveness of the metal powder superior. This makes it possible to especially improve the storage stability and the ejection stability of the ultraviolet ray curable ink jet composition. Examples of the dispersing agent include, but are not limited to, a polyoxy alkylene polyalkylene polyamine, a vinyl-type polymer and copolymer, an acryl-type polymer and copolymer, a polyester, a polyamide, a polyimide, a polyurethane, an amino-type polymer, a silicon-containing polymer, a sulfur-containing polymer, a fluorine-containing polymer, an epoxy resin, and the like.

Further, it is preferred that the ultraviolet ray curable ink jet composition of the invention does not contain an organic solvent which would be removed (vapored) during steps of producing the printed object. This makes it possible to effectively prevent a problem resulted from a volatile organic compound (VOC) from being generated.

A viscosity at room temperature (20° C.) of the ultraviolet ray curable ink jet composition of the invention is preferably 20 mPa·s or less, and more preferably in the range of 3 to 15 mPa·s. This makes it possible to appropriately eject the ultraviolet ray curable ink jet composition by using the ink jet method.

Printed Object

Next, a printed object of the invention will be described.

The printed object of the invention is produced by applying the above mentioned ultraviolet ray curable ink jet composition onto an object (recording medium), and then irradiating the ultraviolet ray curable ink jet composition with an ultraviolet ray. Such a recorded object is provided with a pattern (printed portion) having high gloss and wear resistance.

As described above, the ultraviolet ray curable ink jet composition according to the invention contains the polymerizable compound, and thus exhibits excellent adhesion with respect to the object. Therefore, since the ultraviolet ray curable ink jet composition exhibits the excellent adhesion with respect to the object, the object may be any types. As the object, an absorbent object or an unabsorbent object may be used. For example, a paper (e.g., a plain paper, a special paper for ink jet), a plastic material, a metal, a ceramics, a timber, a shell, a natural or synthetic fiber such as cotton, a polyester or wool, a non-woven fabric or the like can be used.

The printed object of the invention may be used in any applications, for example, may be used in trinkets or articles other than the trinkets. Concrete examples of the printed object of the invention include: vehicular interior trims such as a console lid, a switch base, a center cluster, an interior panel, an emblem, a center console and meter nameplate; operating portions of various kinds of electronic devices (keyswitchs); trims exhibiting decorativeness; presentments such as an index and a logo; and the like.

As a system for ejecting liquid droplets (that is, a system of the ink jet method), a piezo system, a system for ejecting an ink by bubbles which are generated by heating the ink, or the like can be used. However, the piezo system is preferable, for the reason that the ultraviolet ray curable ink jet composition is difficult to be deteriorated, and the other reasons.

The ejection of the ultraviolet ray curable ink jet composition by the ink jet method can be carried out by using a well-known liquid droplet ejection device.

The ultraviolet ray curable ink jet composition ejected by the ink jet method is cured by being irradiated with an ultraviolet ray.

As an ultraviolet ray irradiation source, for example, a mercury lamp, a metal halide lamp, an ultraviolet ray light emitting diode (UV-LED), an ultraviolet ray laser diode (UV-LD) or the like can be used. Among them, the ultraviolet ray light emitting diode (UV-LED) and the ultraviolet ray laser diode (UV-LD) is preferable, for the reason that such a source has a small size, a long life time, high efficiency and a low cost.

While the invention has been described hereinabove based on the preferred embodiments, the invention is not limited thereto.

EXAMPLES

Next, a description will be made on concrete examples of the metal powder of the invention.

1-1. Production of Metal Powder (Paste-Like Dispersion Liquid)

Example A1

First, prepared was a film having a flat surface and made of polyethylene terephthalate (surface roughness Ra: 0.02 μm or less).

Next, silicone oil was applied onto the entirety of one surface of the film.

Next, a coat made of Al was formed onto a surface of the film on which the silicone oil was applied by using an evaporation method.

The film (base) made of polyethylene terephthalate, on which the Al coat was formed, was dipped into a liquid constituting from diethylene glycol diethyl ether, and then ultrasonic vibration was applied thereto. In this way, obtained was a dispersing element (dispersion liquid) of scaly particles (that is, particles to be used as base particles) each made of Al. An amount of the particles each made of Al in the dispersing element was 3.7 mass %.

Next, a mixture of $CF_3(CF_2)_5(CH_2)_2O(P)(OH)_2$ and $CF_3(CF_2)_5(CF_2)_2O(P)(OH)(OCH_2CF_3)$ (5:95 at a mass ratio) as the fluorine type phosphoric acid ester of 5 parts by mass with respect to the particles made of Al of 100 parts by weight was added to the dispersing element containing the particles made of Al and obtained as described above to obtain a mixture. Ultrasonic vibration was applied to the mixture at a liquid temperature of 55° C. for 3 hours, so that the particles made of Al were subjected to a surface treatment. Thereafter, the centrifugal setting of the particles made of Al which were subjected to the surface treatment (metal particles of the metal powder) was carried out with a centrifugal machine (6000 rpm×30 minutes) to obtain a supernatant part of the mixture. Thus, the supernatant part was discarded. Next, a mixture of diethyleneglycol diethylether and the metal particles was obtained, namely, diethyleneglycol diethylether was added to the resultant which the supernatant part was removed. Thereafter, the ultrasonic vibration was applied to the mixture to re-disperse the metal particles of the metal powder in the mixture, so that a dispersion liquid (re-dispersion liquid) in which an amount of the metal particles of the metal powder was 3.7 mass % was obtained. The re-dispersion liquid was concentrated with an evaporator, so that a paste-like dispersion liquid (dispersion medium: diethyleneglycol diethylether) in which an amount of the metal particles of the metal powder was 10 mass % was obtained. An average particle size and an average thickness of the thus obtained metal particles of the metal powder were 0.8 μm and 20 nm, respectively.

Examples A2 to A11

Metal powder was produced in the same manner as Example A1 except that a composition of the base particles and a kind of compound (fluorine type phosphoric acid ester) used for the surface treatment were changed as shown in Table 1.

Comparative Example A1

Metal powder was produced in the same manner as Example A1 except that a step of subjecting to the surface treatment was omitted and particles each made of Al were used as the metal particles of the metal powder as it was.

Comparative Example A2

Spherical particles of Al powder were produced by using an atomize method. The particles were used as the metal powder as it was without the surface treatment to the particles of the Al powder.

Comparative Example A3

First, a dispersing element (dispersion liquid) was obtained in the same manner as Example A1. Such a dispersing element was constituted from a dispersion medium of diethyleneglycol diethylether and a dispersoid of the scaly-shape particles made of Al (particles to become the base particles, which were not subjected to the surface treatment).

Next, the dispersing element was subjected to the centrifugal separation (6000 rpm×30 minutes). Thereafter, the centrifugal setting of the particles made of Al (particles to become the base particles) was carried out to obtain a supernatant part of the dispersing element. Thus, the supernatant part was discarded. Thereafter, the particles made of Al were added into a 10 mass % aqueous solution of PALCOAT3796 (produced by NIHON PARKERIZING CO., LTD., which contained a zircon hydrofluoric acid as a major component thereof) as a surface treatment agent which was not the fluorine type phosphoric acid ester to obtain a mixture. Furthermore, the ultrasonic vibration was applied to the mixture, and then the mixture was maintained at a temperature of 80° C. for 10 minutes. Thus, particles made of Al were subjected to the surface treatment.

Thereafter, the centrifugal setting of the particles made of Al which were subjected to the surface treatment (metal particles of the metal powder) was carried out with a centrifugal machine (6000 rpm×30 minutes) to obtain a supernatant part of the mixture. Thus, the supernatant part was discarded. Next, pure water was added to the metal particles, namely, the pure water was added to the resultant which the supernatant part was discarded, to obtain a mixture. Thereafter, the ultrasonic vibration was applied to the mixture to re-disperse the metal particles of the metal powder in the mixture, which were repeated two times.

Thereafter, the centrifugal setting of the metal particles of the metal powder was carried out with a centrifugal machine (6000 rpm×30 minutes) to obtain a supernatant part of the mixture. Thus, the supernatant part was discarded. Next, diethyleneglycol diethylether was added to the metal particles, namely, the diethyleneglycol diethylether was added to the resultant which the supernatant part was discarded, to obtain a mixture. Furthermore, the ultrasonic vibration was applied to the mixture to re-disperse the metal particles of the metal powder, so that a dispersion liquid (re-dispersion liquid) in which an amount of the metal particles of the metal powder was 3.7 mass % was obtained. The re-dispersion liquid was concentrated with an evaporator, so that a paste-like dispersion liquid (dispersion medium: diethyleneglycol diethylether) in which an amount of the metal particles of the metal powder was 10 mass % was obtained.

In each of the Examples and the Comparative Examples, compositions of the metal particles of the metal powder are shown in Table 1. In this regard, it is to be noted that "S1"

represents the mixture of $CF_3(CF_2)_5(CH_2)_2(O)P(OH)_2$ and $CF_3(CF_2)_5(CH_2)_2(O)P(OH)(OCH_2CH_3)$ (5:95 at a mass ratio), "S2" represents $CF_3(CF_2)_4(CH_2)_2O$—$PO(OH)_2$, "S3" represents $CF_3(CF_2)_5(OH_2)_2(O)P(OH)_2$, "S4" represents $CF_3(CF_2)_5(CH_2)_2O(P)(OH)(OCH_2CH_3)$, "S5" represents $CF_3(CF_2)_1(CH_2)_3P(O)(OCH_2CH_3)$, "S6" represents $CF_3(CF_2)_5(CH_2)_2O$—$PO(OH)(OC_2H_5)$, "S7" represents $CF_3(CF_2)_{14}(CH_2)_4P(O)(OH)(OCH_2CH_3)$, "S'1" represents a zircon hydrofluoric acid in Table 1. Furthermore, in Tables, a ratio of the respective atoms contained in the composition of the constituent material of the base particles obtained in Example A9 is indicated as a ratio by weight. Further, arbitrary 10 metal particles contained in the metal powder obtained in each of the Examples and Comparative Examples were observed. In each of the metal particles, an area of the metal particle observed from a direction where a project area thereof becomes maximum (that is, an area of each metal particle at a planar view thereof) is defined as $S_1$ (μm$^2$) and an area of the metal particle observed from a direction where the area of the metal particle observed from directions orthogonal to the above observation direction becomes maximum is defined as $S_0$ (μm$^2$), and a ratio of $S_1$ to $S_0(S_1/S_0)$ was calculated to obtain 10 values. An average of the calculated 10 values was also indicated in Table 1.

TABLE 1

| | Constituent material of base particles | Material used for surface treatment | Shape | Average particle size [μm] | $S_1/S_0$ |
|---|---|---|---|---|---|
| Ex. A1 | Al | S1 | Scaly | 0.8 | 25 |
| Ex. A2 | Al | S2 | Scaly | 0.9 | 39 |
| Ex. A3 | Al | S3 | Scaly | 2.0 | 51 |
| Ex. A4 | Al | S5 | Scaly | 1.1 | 25 |
| Ex. A5 | Al | S4 | Scaly | 1.0 | 29 |
| Ex. A6 | Al | S7 | Scaly | 0.7 | 37 |
| Ex. A7 | Al | S6 | Scaly | 0.9 | 38 |
| Ex. A8 | Al | S5 | Scaly | 1.5 | 21 |
| Ex. A9 | Ni49.5Fe50.5 | S3 | Scaly | 1.8 | 19 |
| Ex. A10 | SUS316L | S4 | Scaly | 1.5 | 22 |
| Ex. A11 | Al | S1 + S2 | Scaly | 0.8 | 50 |
| Com. Ex. A1 | Al | — | Scaly | 0.8 | 26 |
| Com. Ex. A2 | Al | — | Spherical | 1.0 | — |
| Com. Ex. A3 | Al | S'1 | Scaly | 0.8 | 26 |

1-2. Evaluation of Appearance

The paste-like dispersion liquid containing the metal powder (an amount of the metal powder: 10 mass %) produced in each of the Examples and the Comparative Examples was applied to a surface of a glass plate (10 cm square) with a paddle (coating amount: 30 g/cm$^2$) to form a coating film. The coating film was visually observed, and an appearance of the coating film was evaluated according to the following criteria including 7 grades.

A: The coating film exhibits high brightness, and has extra excellent appearance.

B: The coating film exhibits high brightness, and has very excellent appearance.

C: The coating film exhibits high brightness, and has excellent appearance.

D: The coating film exhibits high brightness, and has appropriate appearance.

E: The coating film exhibits inferior brightness, and has slightly poor appearance.

F: The coating film exhibits inferior brightness, and has poor appearance.

G: The coating film exhibits inferior brightness and gloss, and has extra poor appearance.

1-3. Evaluation of Durability

Saltwater corrosion experiments were performed according to the following processes by using the paste-like dispersion liquid containing the metal powder (the amount of the metal powder: 10 mass %) produced in each of the Examples and the Comparative Examples. Thus, corrosion resistance of the coating film was evaluated.

First, a 10 mass % salt solution of 10 g was added into the paste-like dispersion liquid containing the metal powder (the amount of the metal powder: 10 mass %) of 10 g to obtain a mixture. Then, the mixture was stirred and left for 24 hours with warming at 50° C.

Thereafter, for a purpose of washing the metal powder (removing salt), the following processes were performed to the mixture. In other words, the mixture was separated to a solid part and a liquid part with a centrifugal separation machine. Thereafter, the liquid part (salt solution) was removed, and then pure water of 110 g was added to the separated solid part (metal powder) to obtain a solid-part aqueous solution. Then, ultrasonic vibration was further applied to the solid-part aqueous solution to re-disperse the solid part. This series of processes were repeated two times.

Thereafter, the solid-part aqueous solution was separated to a solid part and a liquid part again with the centrifugal separation machine. Then, the liquid part (pure water) was removed, and then the separated solid part was re-dispersed in diethyleneglycol to obtain a paste-like dispersion liquid in which an amount of the metal powder was 10 mass %. The dispersion liquid was applied to a surface of a glass plate (10 cm square) with a paddle (coating amount: 30 g/cm$^2$) to form a coating film. The coating film was visually observed, and an appearance of the coating film was evaluated according to the following criteria including 2 grades.

A: The appearance of the coating film obtained by using the metal powder that the saltwater corrosion experiments were performed and the appearance of the coating film obtained by using the metal powder that no saltwater corrosion experiments were performed are not changed.

E: A color of the coating film obtained by using the metal powder that the saltwater corrosion experiments were performed was changed (to a white color) due to the corrosion (oxidation) thereof.

These results are shown in Table 2.

TABLE 2

| | Appearance | Durability |
|---|---|---|
| Ex. A1 | A | A |
| Ex. A2 | A | A |
| Ex. A3 | A | A |
| Ex. A4 | A | A |
| Ex. A5 | A | A |
| Ex. A6 | A | A |
| Ex. A7 | A | A |
| Ex. A8 | A | A |
| Ex. A9 | A | A |
| Ex. A10 | A | A |
| Ex. A11 | A | A |
| Com. Ex. A1 | F | E |
| Com. Ex. A2 | G | E |
| Com. Ex. A3 | E | E |

As shown in Table 2, the coating film obtained by using the metal powder of the invention had excellent gloss and the appearance having high-grade sense. Further, the coating film had excellent durability and could maintain the excellent gloss and aesthetic aspect for a long period of time. In contrast, the Comparative Examples could not obtain sufficient results.

2-1. Production of Coating Material

Example B1

A coating material (powder coating material) was produced by mixing the paste-like dispersion liquid of 3.7 parts by weight which contained the metal powder produced in the Example A1 in the item 1-1, ACRYDIC A160 (acryl resin, produced by DIC) of 35 parts by weight, ethyl acetate of 18 parts by weight, cyclohexane of 18 parts by weight, butylcellosolve of 11 parts by weight, methylcellosolve of 5 parts by weight and isopropyl alcohol of 9.3 parts by weight.

Examples B2 to B11

A coating material (powder coating material) was produced in the same manner as the Example B1 except that the metal powder produced in each of the Examples A2 to A11 was used as the metal powder instead of the metal powder produced in the Example A1.

Comparative Examples B1 to B3

A coating material (powder coating material) was produced in the same manner as the Example B1 except that the metal powder produced in each of the Comparative Examples A1 to A3 was used as the metal powder instead of the metal powder produced in the Example A1.

2-2. Evaluation of Sedimentation Property

The coating material of 80 cc produced in each of the Examples and the Comparative Examples was added into a glass bottle of 110 cc, and then it was left at normal temperature (20° C.) for 30 days. At this time, a degree of the sedimentation of the metal powder was evaluated according to the following criteria.

A: The segmentation of the metal powder does not occur, and a solid-liquid separation hardly generate.

B: The segmentation of the metal powder occurs slightly, but if the coating material is mixed with a brush, the coating material is dispersed, which is no problem in use of the coating material.

C: The segmentation of the metal powder occurs, if the coating material is mixed with a brush, the coating material is dispersed, but it is difficult to use the coating material.

D: The segmentation of the metal powder occurs, if the coating material is mixed with a brush, the coating material is not dispersed, which is an unusable state of the coating material. However, if the coating material is subjected to an ultrasonic sound wave treatment, the coating material is dispersed again.

E: The metal powder settles down and solidifies or is in a solidified state due to any reactions.

F: A color of the coating material is changed.

2-3. Evaluation of Coating Property

The coating material produced in each of the Examples and the Comparative Examples was applied to a surface of a plate material made of SUS 314 as a coated object (base material) by using a brush. The coating property at this time was evaluated according to the following criteria.

A: The coating property is extra excellent.
B: The coating property is excellent.
A: The coating property is good.
A: The coating property is slightly poor.
A: The coating property is poor.

2-4. Production of Printed Object

The coating material produced in each of the Examples and the Comparative Examples was applied onto a plate material made of polyethylene terephtalate as a recording medium (object) ("e-Pane PET" produced by ZAPP, a thickness: 3 mm) by an air spray under the environments of a temperature 25° C. and a humidity of 55% RH, and the condition of a spray pressure of 5 kg/cm$^2$ to obtain a coating film. An amount of the coating material to be applied was adjusted so that a thickness of finally obtained coating film was 20 μm.

The coating film was left for 24 hours under the environments of the temperature of 25° C. and the humidity of 55% RH, and then was heated at a temperature of 50° C. for 30 minutes. Thus, a recorded object in which the dried coating film was provided on the object was obtained. In this regard, it is to be noted that pattern formation portions on the coating film of the recorded object was obtained.

2-5. Evaluation of Appearance of Recorded Object

The recorded object produced in the above item 2-4 by using the coating material obtained in each of Examples and Comparative Examples was visually observed, and an appearance of the recorded object was evaluated according to the following criteria including 7 grades.

A: The coating film of the recorded object exhibits gloss with very high-grade sense, and has extra excellent appearance.

B: The coating film of the recorded object exhibits gloss with very high-grade sense, and has very excellent appearance.

C: The coating film of the recorded object exhibits gloss with high-grade sense, and has excellent appearance.

D: The coating film of the recorded object exhibits gloss with high-grade sense, and has appropriate appearance.

E: The coating film of the recorded object exhibits inferior gloss, and has slightly poor appearance.

F: The coating film of the recorded object exhibits inferior gloss, and has poor appearance.

G: The coating film of the recorded object exhibits inferior gloss, and has extra poor appearance.

2-6. Glossiness

Glossiness of the pattern formation portions of the recorded object produced in the above item 2-4 by using the coating material obtained in each of the Examples and the Comparative Examples was measured at an inclination angle of 60° by using a gloss meter ("MINOLTA MULTI GLOSS 268"), and the glossiness was evaluated according to the following criteria including 4 grades.

A: The glossiness of the pattern formation portions is 450 or more.

B: The glossiness of the pattern formation portions is 300 or more, but less than 450.

C: The glossiness of the pattern formation portions is 200 or more, but less than 300.

D: The glossiness of the pattern formation portions is but less than 200.

2-7. Evaluation of Durability

2-7-1. Evaluation 1

The recorded object produced in the above item 2-4 by using the coating material obtained in each of the Examples and the Comparative Examples was left for 160 hours under the environments of a temperature of 80° C. and a humidity of 80% RH.

Thereafter, the glossiness of the pattern formation portions was evaluated according to the same criteria including the same grades as those of the above item 2-6.

2-7-2. Evaluation 2

In the recorded objects before and after the evaluations of the durability in the above item 2-7-1, colors of the coating films of the recorded objects were measured by using a spectrophotometer ("MCPD3000" produced by OTSUKA ELECTRONICS CO., LTD.) to obtain colorimetric values. From the results, a color difference (color difference ΔE in a Lab color space) between the colorimetric values of the coating films of the printed objects before and after the evaluations of the durability in the above item 2-7-1 was obtained. Then, the color difference was evaluated according to the following criteria including the 4 grades.

A: ΔE is less than 3.
B: ΔE is 3 or more, but less than 6.
C: ΔE is 6 or more, but less than 12.
D: ΔE is 12 or more.

2-8. Evaluation of Storage Stability of Coating Material

The coating material obtained in each of the Examples and the Comparative Examples was left for 10 days under the environment of a temperature of 50° C.

Thereafter, a printed object was produced by the coating material under the same conditions as those in the above item 2-4.

Thus obtained printed object was evaluated according to the same criteria including the same grades as those of the above items 2-5 and 2-6.

These results are shown in Table 3.

As shown in Table 3, the coating film obtained by using the coating material containing the metal powder of the invention had the excellent gloss and the appearance having the high-grade sense. Further, the coating film had the excellent durability and could be used to produce the printed object which could maintain the excellent gloss and the aesthetic aspect for a long period of time. Further, the coating material containing the metal powder of the invention had a relatively low viscosity and the excellent coating property. Furthermore, the coating material containing the metal powder of the invention also had the excellent storage stability. In contrast, the Comparative Examples could not obtain sufficient results.

3-1. Production of Ink Jet Composition (Ultraviolet Ray Curable Ink Jet Composition)

Example C1

First, prepared was a film having a flat surface and made of polyethylene terephthalate (surface roughness Ra: 0.02 μm or less).

Next, silicone oil was applied onto the entirety of one surface of the film.

Next, a coat made of Al was formed onto a surface of the film on which the silicone oil was applied by using an evaporation method.

Next, the film (base) made of polyethylene terephthalate, on which the Al coat was formed, was dipped into a liquid constituting from diethylene glycol diethyl ether, and then ultrasonic vibration was applied thereto. In this way, obtained were scaly particles (that is, particles to be used as base particles) each made of Al.

Next, the particles each made of Al and obtained as described above were dipped into a propanol solution containing $CF_3(CF_2)_5(CH_2)_2O-PO(OH)_2$ of 1 wt % as a fluorine type phosphoric acid ester to obtain a mixture. The mixture was stirred for 10 seconds, so that the particles made of Al were subjected to a surface treatment with the fluorine type phosphoric acid ester, to thereby obtain metal powder.

An average particle size and an average thickness of metal particles of thus obtained metal powder were 0.8 μm and 35 nm, respectively.

TABLE 3

| | Sedimentation property | Coating property | Appearance | Glossiness | Durability Evaluation 1 | Evaluation 2 | Storage stability Appearance | Glossiness |
|---|---|---|---|---|---|---|---|---|
| Ex. B1 | A | A | A | A | A | A | A | A |
| Ex. B2 | A | A | A | A | A | A | A | A |
| Ex. B3 | A | A | A | A | A | A | A | A |
| Ex. B4 | B | B | A | B | B | B | A | B |
| Ex. B5 | A | A | A | A | A | A | A | A |
| Ex. B6 | B | B | A | B | B | B | A | B |
| Ex. B7 | A | A | A | A | A | A | A | A |
| Ex. B8 | B | B | A | B | B | B | A | B |
| Ex. B9 | B | B | A | B | B | B | A | B |
| Ex. B10 | B | B | A | B | B | B | A | B |
| Ex. B11 | A | A | A | A | A | A | A | A |
| Com. Ex. B1 | E | E | F | C | D | D | G | D |
| Com. Ex. B2 | D | D | G | D | D | D | G | D |
| Com. Ex. B3 | C | C | E | C | D | D | G | D |

Next, phenoxy ethyl acrylate, 2-(2-hydroxy ethoxy)ethyl acrylate, tripropylene glycol diacrylate, dipropylene glycol diacrylate, Irgacure 819 (produced by Ciba Japan k. k.) as a photo initiator, Speedcure TPO (produced by ACETO) as the photo initiator, Speedcure DETX (produced by Lambson) as the photo initiator, UV-3500 (produced by BYK) as a leveling agent and p-methoxy phenol as a polymerization inhibitor were mixed with the metal powder. In this way, obtained was an ink jet composition (ultraviolet ray curable ink jet composition).

Examples C2 to C10

An ink jet composition (ultraviolet ray curable ink jet composition) was prepared in the same manner as Example C1 except that a constitution of the metal particles (a composition of the base particles and a kind of fluorine type phosphoric acid ester to be used for a surface treatment of the base particles) was changed as shown in Table 4. In addition to that, a kind and ratio of the raw materials used for preparing the ink jet composition (ultraviolet ray curable ink jet composition) were changed to the constitution of the metal particles as shown in Table 4.

Comparative Example C1

An ink jet composition (ultraviolet ray curable ink jet composition) was produced in the same manner as the Example C1 except that particles each made of Al and not subjected to the surface treatment with the fluorine type phosphoric acid ester were used as the metal powder.

Comparative Example C2

An ink jet composition (ultraviolet ray curable ink jet composition) was prepared in the same manner as the Comparative Example C1 except that Al powder having particulate particles (which were not subjected to the surface treatment with the fluorine type phosphoric acid ester) produced by a gas atomize method was used as metal powder.

Comparative Example C3

An ink jet composition (ultraviolet ray curable ink jet composition) was produced in the same manner as the Example C1 except that the particles made of Al were subjected to a surface treatment with $CF_3(CH_2)_7O—PO(OH)_2$ which was not the fluorine type phosphoric acid ester instead of $CF_3(CF_2)_5(CH_2)_2O—PO(OH)_2$ as the fluorine type phosphoric acid ester to obtain metal powder.

Comparative Example C4

Metal powder of scaly metal particles obtained in the same manner as the Example C1, 1,2-hexanediol, trimethylol propane, surfynol 465 (produced by Nissin Chemical Industry CO., Ltd.), triethanolamine, glycerine, POLYFLOW 401 (produced by Nissin Chemical Industry CO., Ltd.) and an ion exchanged water were mixed with each other. In this way, an ink jet composition was produced. Namely, the ink jet composition of this Comparative Example did not contain the polymerizable compound to be cured by the ultraviolet ray irradiation.

The constitutions of the ink jet compositions obtained in each of the Examples and the Comparative Examples are shown in Table 4. In this Table, indicated were $CF_3(CF_2)_5(CH_2)_2O—PO(OH)_2$ as "PF1", $CF_3(CF_2)_5(CH_2)_2—PO(OH)_2$ as "PF2", $CF_3(CF_2)_5(CH_2)_2—PO(OH)_2$ as "PF3", $CF_3(CF_2)_3(CH_2O)_{10}—PO(OH)_2$ as "PF4", $CF_3(CF_2)_{11}O—PO(OH)_2$ as "PF5", $CF_3(CF_2)_7—PO(OH)_2$ as "PF6", $(CF_3(CF_2)_5(CH_2)_2O)_2—PO(OH)$ as "PF7", $(CF_3(CF_2)(CH_2O))_3—PO$ as "PF8", $CH_3(CH_2)_7O—PO(OH)_2$ as "PH1", phenoxy ethyl acrylate as "PEA", 2-(2-hydroxy ethoxy)ethyl acrylate as "VEEA", tripropylene glycol diacrylate as "TPGDA", dipropylene glycol diacrylate as "DPGDA", N-vinyl caprolactam as "VC", benzyl methacrylate as "BM", dimethylol tricyclodecane diacrylate as "DMTCDDA", amino acrylate as "AA", urethane acrylate as "UA", Irgacure 819 (produced by Ciba Japan k. k.) as "ic819", Speedcure TPO (produced by Lambson) as "scTPO", Speedcure DETX (produced by Lambson) as "scDETX", UV-3500 (produced by BYK) as "UV3500", p-methoxy phenol as "pMP", 4-hydroxy butyl acrylate as "HBA", 1,2-hexanediol as "1,2HD", trimethylol propane as "TMP", surfynol 465 (produced by Nissin Chemical Industry CO., Ltd.) as "S465", triethanolamine as "TEA", glycerine as "GL", and POLYFLOW 401 (produced by Nissin Chemical Industry CO., Ltd.) as "PF401". Further, arbitrary 10 metal particles contained in each ink jet composition were observed. In each of the metal particles, an area of the metal particle observed from a direction where a project area thereof becomes maximum (that is, an area of each metal particle at a planar view thereof) is defined as $S_1$ ($\mu m^2$) and an area of the metal particle observed from a direction where the area of the metal particle observed from directions orthogonal to the above observation direction becomes maximum is defined as $S_0$ ($\mu m^2$), and a ratio of $S_1$ to $S_0$ ($S_1/S_0$) was calculated to obtain 10 values. An average of the calculated 10 values was also indicated in Table 4. Furthermore, in Table, a ratio of the respective atoms contained in the composition the constituent material of the base particles obtained in each of the Examples 6 and 10 was indicated as a ratio by weight. Moreover, a viscosity at 20° C. of the ink jet composition (ultraviolet ray curable ink jet composition) obtained in each of the Examples, which was measured by using an oscillating type viscometer based on JIS 28809, was a value falling within a range of 3 to 15 mPa·s.

TABLE 4

| | Constitution of metal powder | | | Constitution of ink jet composition | | | |
|---|---|---|---|---|---|---|---|
| | | Material | Metal particles of metal powder | | | | |
| | Constituent material of base particles | used for surface treatment | Shape | Average particle size [μm] | $S_1/S_0$ | Amount [wt %] | Polymerizable compound |
| Ex. C1 | Al | PF1 | Scaly | 0.8 | 50 | 2.0 | PEA/VEEA/TPGDA/DPGDA/HBA |
| Ex. C2 | Al | PF2 | Scaly | 0.9 | 39 | 3.0 | PEA/TPGDA/DPGDA/VC/DMTCDDA/AA |

TABLE 4-continued

| | | | | | | | |
|---|---|---|---|---|---|---|---|
| Ex. C3 | Al | PF3 | Scaly | 1.0 | 51 | 2.0 | PEA/VEEA/TPGDA/ DPGDA/DMTCDDA/AA |
| Ex. C4 | Al | PF4 | Scaly | 1.1 | 25 | 2.0 | PEA/VEEA/TPGDA/ DPGDA/AA/HBA |
| Ex. C5 | Al | PF5 | Scaly | 1.0 | 29 | 2.0 | PEA/VEEA/TPGDA/ DPGDA/BM/DMTCDDA/UA |
| Ex. C6 | Al90.65Mg2.54 Cu1.60Zn5.19Mn0.02 | PF1 | Scaly | 0.7 | 37 | 2.0 | PEA/VEEA/DPGDA |
| Ex. C7 | Al | PF6 | Scaly | 0.9 | 38 | 2.0 | PEA/VEEA/DPGDA |
| Ex. C8 | Al | PF7 | Scaly | 1.5 | 21 | 2.0 | PEA/VEEA/TPGDA/ DPGDA/BM |
| Ex. C9 | Al | PF8 | Scaly | 1.8 | 19 | 2.0 | PEA/VEEA/ TPGDA/DPGDA/AA |
| Ex. C10 | Ni49.5Fe50.5 | PF1 | Scaly | 1.5 | 22 | 2.0 | PEA/VEEA/ TPGDA/DPGDA/BM |
| Com. Ex. C1 | Al | — | Scaly | 0.8 | 50 | 2.0 | PEA/VEEA/ TPGDA/DPGDA |
| Com. Ex. C2 | Al | — | Spherical | 0.8 | 1 | 2.0 | PEA/VEEA/ TPGDA/DPGDA |
| Com. Ex. C3 | Al | PH1 | Scaly | 0.8 | 50 | 2.0 | PEA/VEEA/ TPGDA/DPGDA |
| Com. Ex. C4 | Al | PF1 | Scaly | 0.8 | 50 | 3.0 | — |

| | Constitution of ink jet composition | |
|---|---|---|
| | Polymerizable compound | Other components |
| | Amount [wt %] | Amount [wt %] |
| Ex. C1 | 36.5/39.6/ 2.0/5.5/4.0 | ic819/scTPO/ scDETX/UV3500/pMP | 4.0/4.0/ 2.0/0.2/0.2 |
| Ex. C2 | 47.5/14.6/8.5/ 8.0/5.0/3.0 | ic819/scTPO/ scDETX/UV3500/pMP | 4.0/4.0/ 2.0/0.2/0.2 |
| Ex. C3 | 27.0/24.8/18.0/ 12.8/4.0/1.0 | ic819/scTPO/ scDETX/UV3500/pMP | 4.0/4.0/ 2.0/0.2/0.2 |
| Ex. C4 | 65.6/3.5/5.0/ 5.5/4.0/4.0 | ic819/scTPO/ scDETX/UV3500/pMP | 4.0/4.0/ 2.0/0.2/0.2 |
| Ex. C5 | 7.3/10.0/33.6/ 2.0/20.0/3.7/15 | ic819/scTPO/ UV3500/pMP | 3.0/3.0/ 0.2/0.2 |
| Ex. C6 | 52.6/16.0/19.0 | ic819/scTPO/ scDETX/UV3500/pMP | 4.0/4.0/ 2.0/0.2/0.2 |
| Ex. C7 | 49.6/21.0/17.0 | ic819/scTPO/ scDETX/UV3500/pMP | 4.0/4.0/ 2.0/0.2/0.2 |
| Ex. C8 | 2.5/17.2/33.6/ 13.5/20.8 | ic819/scTPO/ scDETX/UV3500/pMP | 4.0/4.0/ 2.0/0.2/0.2 |
| Ex. C9 | 80.0/1.6/ 2.0/2.0/2.0 | ic819/scTPO/ scDETX/UV3500/pMP | 4.0/4.0/ 2.0/0.2/0.2 |
| Ex. C10 | 5.0/17.7/ 33.6/13.5/17.8 | ic819/scTPO/ scDETX/UV3500/pMP | 4.0/4.0/ 2.0/0.2/0.2 |
| Com. Ex. C1 | 40.5/39.6/ 2.0/5.5 | ic819/scTPO/ scDETX/UV3500/pMP | 4.0/4.0/ 2.0/0.2/0.2 |
| Com. Ex. C2 | 40.5/39.6/ 2.0/5.5 | ic819/scTPO/ scDETX/UV3500/pMP | 4.0/4.0/ 2.0/0.2/0.2 |
| Com. Ex. C3 | 40.5/39.6/ 2.0/5.5 | ic819/scTPO/ scDETX/UV3500/pMP | 4.0/4.0/ 2.0/0.2/0.2 |
| Com. Ex. C4 | — | 水/1,2HD/TMP/ S465/TEA/GL/PF401 | 69.1/3.0/14.0/ 1.5/0.3/9.0/0.1 |

3-2. Evaluation of Stability of Liquid Droplet Ejection (Ejection Stability Evaluation)

The ink jet composition obtained in each of the Examples and the Comparative Examples was evaluated by tests described below.

First, a liquid droplet ejection device provided inside a chamber (thermal chamber) and the ink jet composition obtained in each of the Examples and the Comparative Examples were prepared. Next, in a state that driving waveforms of piezo elements were optimized, 2,000,000 liquid droplets of the ink jet composition were continuously ejected from the respective nozzles of a liquid droplet ejection head under the environments of 25° C. and 55% RH. Thereafter, operation of the liquid droplet ejection device was stopped, and then it was left under the environments of 25° C. and 55% RH for 240 hours in a state that the ink jet composition was filled into flow passes of the liquid droplet ejection device.

Thereafter, 3,000,000 liquid droplets of the ink jet composition were continuously ejected from the respective nozzles of the liquid droplet ejection head under the environments of 25° C. and 55% RH. 3,000,000 liquid droplets were ejected from the specified nozzles located at a central portion of the liquid droplet ejection head of the liquid droplet ejection device after a lapse of 240 hours on a recording medium (object). Then, a shift length "d" between a center point of each of the droplets landed to the object and an objective point thereof to be landed to the object was measured. An average value of the thus obtained shift lengths "d" (3,000,000 differences) was calculated. The calculated average value was evaluated according to the following criteria including 5 grades. In this regard, it is to be noted that a smaller average value means that change of an ejecting direction of each liquid droplet is effectively prevented.

A: The average value of the shift lengths "d" is less than 0.09 μm.

B: The average value of the shift lengths "d" is 0.09 μm or more, but less than 0.15 μm.

C: The average value of the shift lengths "d" is 0.15 μm or more, but less than 0.18 μm.

D: The average value of the shift lengths "d" is 0.18 μm or more, but less than 0.22 μm.

E: The average value of the shift lengths "d" is 0.22 μm or more.

3-3. Evaluation of Storage Stability of Ink Jet Composition (Long-Term Stability Evaluation)

The ink jet composition obtained in each of the Examples and the Comparative Examples was left for 30 days under the environment of 40° C. Thereafter, a viscosity at 20° C. of the ink jet composition obtained in each of the Examples was measured by using an oscillating type viscometer based on JIS 28809, and then an increasing ratio of the viscosity at 20° C. of the ink jet composition with respect to the viscosity of the ink jet composition just prepared was calculated. The increasing ratio was evaluated according to the following criteria including 5 grades.

A: The increasing ratio of the viscosity is less than 10%.

B: The increasing ratio of the viscosity is 10% or more, but less than 15%.

C: The increasing ratio of the viscosity is 15% or more, but less than 20%.

D: The increasing ratio of the viscosity is 20% or more, but less than 25%.

E: The increasing ratio of the viscosity is 25% or more, or generation of foreign materials is observed.

3-4. Curing Property

The ink jet composition obtained in each of the Examples and the Comparative Examples was loaded to an ink jet printer ("PM800C" produced by Seiko Epson Corporation), solid printing of the ink jet composition onto a recording medium having a thickness of 38 μm ("DIAFOIL G440E" produced by Mitsubishi Plastics Inc.) was carried out in an ink amount of wet 9 g/m$^2$, and then the ink jet composition was immediately irradiated with ultraviolet ray (gap: 6 mm, peak wavelength: 365 nm, 1000 mW/cm$^2$) using a LED-UV lump ("RX firefly" produced by Phoseon Technology). Thereafter, it was confirmed whether or not the ink jet composition was cured. The curing property was evaluated according to the following criteria including 5 grades. The judgment whether or not the ink jet composition is cured was carried out by rubbing a surface of the ink jet composition with a swab and observing whether or not a non-cured matter of the ink jet composition adhered to the swab. In this regard, it is to be noted that an ultraviolet ray irradiation amount can be calculated by the number of seconds when the LED-UV lump was lighted.

A: The ink jet composition was cured by the ultraviolet ray irradiation amount of 100 mJ/cm$^2$ or less.

B: The ink jet composition was cured by the ultraviolet ray irradiation amount of 100 mJ/cm$^2$ or more, but less than 200 mJ/cm$^2$.

C: The ink jet composition was cured by the ultraviolet ray irradiation amount of 200 mJ/cm$^2$ or more, but less than 500 mJ/cm$^2$.

D: The ink jet composition was cured by the ultraviolet ray irradiation amount of 500 mJ/cm$^2$ or more, but less than 1,000 mJ/cm$^2$.

E: The ink jet composition was cured by the ultraviolet ray irradiation amount of 1,000 mJ/cm$^2$ or more, or was never cured.

3-5. Production of Recorded Object

An interior panel as a recorded object was produced by using the ink jet composition obtained in each of the Examples and the Comparative Examples as follows.

First, the ink jet composition was loaded to an ink jet device.

Next, on a base material having a curved surface portion, which was formed by using a polycarbonate sheet with a thickness of 2 mm ("CARBOGLASS polish" produced by ASAHI GLASS CO., LTD.) (that is, a recording medium or object), the ink jet composition was ejected in a predetermined pattern.

Thereafter, the ink jet composition was irradiated with an ultraviolet ray having a spectrum with maximum values at wavelengths of 365 nm, 380 nm and 395 nm and an radiation intensity of 180 mW/cm$^2$ for 20 seconds, and thus was cured. In this way, the interior panel was produced as the recorded object.

In each of the Examples and the Comparative Examples, 10 interior panels (recorded objects) were produced by using the ink jet composition obtained in each of the Examples of the Comparative Examples according to the above mentioned method.

Further, 10 interior panels (recorded objects) were produced by using the ink jet composition obtained in each of the Examples and the Comparative Examples in the same method as described above, except that a base material formed by using a polyethylene terephthalate sheet with a thickness of 38 μm ("DIAFOIL G440E" produced by Mitsubishi Plastics Inc.), a base material formed by using a low density polyethylene sheet ("T.U.X (L-LDPE) HC-E #80" produced by Mitsui Chemicals Tohcello Inc.), a base material formed by using a biaxial stretching polypropylene sheet ("OP U-1 #60" produced by Mitsui Chemicals Tohcello Inc.), or a base material formed by using a hard vinyl chloride sheet having a thickness of 0.5 mm ("SUNDAY SHEET (transparent)" produced by ACRYSUNDAY Co., Ltd.) was used. In this regard, the printed object had pattern formation portions.

3-6. Evaluation of Recorded Object

Each of the recorded objects produced in the above mentioned way was evaluated as follows.

3-6.1. Evaluation of Appearance of Recorded Object

The recorded object produced by using the ink jet composition obtained in each of the Examples and the Comparative Examples was visually observed, and an appearance of each of the recorded objects was evaluated according to the following criteria including 7 grades.

A: The recorded object exhibits gloss with very high-grade sense, and has extra excellent appearance.

B: The recorded object exhibits gloss with very high-grade sense, and has very excellent appearance.

C: The recorded object exhibits gloss with high-grade sense, and has excellent appearance.

D: The recorded object exhibits gloss with high-grade sense, and has appropriate appearance.

E: The recorded object exhibits inferior gloss, and has slightly poor appearance.

F: The recorded object exhibits inferior gloss, and has poor appearance.

G: The recorded object exhibits inferior gloss, and has extra poor appearance.

3-6.2. Glossiness

Glossiness of the pattern formation portions of the recorded object produced by using the ink jet composition obtained in each of the Examples and the Comparative Examples was measured at an inclination angle of 60° using a gloss meter ("MINOLTA MULTI GLOSS 268"), and the glossiness was evaluated according to the following criteria including 4 grades.

A: The glossiness is 300 or more.
B: The glossiness is 200 or more, but less than 300.
C: The glossiness is 100 or more, but less than 200.
D: The glossiness is but less than 100.

3-6.3. Wear Resistance

At 48 hours having passed since the production of the recorded object produced by using the ink jet composition obtained in each of the Examples and the Comparative Examples, the recorded object was subjected to a wear resistance test using a Sutherland Rub Tester based on JIS K5701. Thereafter, the glossiness of pattern formation portions of the recorded object after the wear resistance test was also measured at an inclination angle (measurement angle) of 60° in the same manner as described in the above item 3-6.2. A decreasing ratio of the glossinesses of the pattern formation portions of the recorded objects before and after the wear resistance test was calculated, and then the decreasing ratio of the wear resistance was evaluated according to the following criteria including 5 grades.

A: The decreasing ratio of the glossiness is less than 6%.
B: The decreasing ratio of the glossiness is 6% or more, but less than 14%.
C: The decreasing ratio of the glossiness is 14% or more, but less than 24%.
D: The decreasing ratio of the glossiness is 24% or more, but less than 28%.
E: The decreasing ratio of the glossiness is 28% or more.

These results are indicated in Table 5. In this regard, it is to be noted that indicated are the recorded object formed by using the base material made of polycarbonate as "M1", the recorded object formed by using the base material made of polyethylene terephthalate as "M2", the recorded object formed by using the base material made of the low density polyethylene as "M3", the recorded object formed by using the base material made of the biaxial stretching polypropylene as "M4", and the recorded object formed by using the base material made of the hard vinyl chloride as "M5".

TABLE 5

| | Ejection stability | Long-term stability | Curing property | Appearance of printed object | | | | | Glossiness | | | | | Wear resistance | | | | |
|---|---|---|---|---|---|---|---|---|---|---|---|---|---|---|---|---|---|---|
| | | | | M1 | M2 | M3 | M4 | M5 | M1 | M2 | M3 | M4 | M5 | M1 | M2 | M3 | M4 | M5 |
| Ex. C1 | A | A | A | A | A | A | A | A | A | A | A | A | A | A | A | A | A | A |
| Ex. C2 | A | A | A | A | A | A | A | A | A | A | A | A | A | A | A | A | A | A |
| Ex. C3 | A | A | A | A | A | A | A | A | A | A | A | A | A | A | A | A | A | A |
| Ex. C4 | A | A | A | A | A | A | A | A | A | A | A | A | A | A | A | A | A | A |
| Ex. C5 | B | B | A | A | A | A | A | A | A | A | A | A | A | A | A | A | A | A |
| Ex. C6 | A | A | A | A | A | A | A | A | A | A | A | A | A | A | A | A | A | A |
| Ex. C7 | B | B | A | A | A | A | A | A | B | B | B | B | B | A | A | A | A | A |
| Ex. C8 | B | B | B | A | A | A | A | A | A | A | A | A | A | B | B | B | B | B |
| Ex. C9 | B | B | A | A | A | A | A | A | A | A | A | A | A | B | B | B | B | B |
| Ex. C10 | A | A | A | A | A | A | A | A | A | A | A | A | A | A | A | A | A | A |
| Com. Ex. C1 | E | E | A | F | F | F | F | F | C | C | C | C | C | C | C | C | C | C |
| Com. Ex. C2 | D | D | A | G | G | G | G | G | D | D | D | D | D | C | C | C | C | C |
| Com. Ex. C3 | D | D | A | E | E | E | E | E | C | C | C | C | C | C | C | C | C | C |
| Com. Ex. C4 | C | C | — | C | C | C | C | C | C | C | C | C | C | E | E | E | E | E |

As shown in Table 5, the ultraviolet ray curable ink jet composition of the invention was excellent in the liquid droplet ejection stability, the storage stability and the curing property. Further, the recorded object of the invention exhibited superior gloss and had excellent appearance, and the pattern formation portion also had high wear resistance. On the other hand, sufficient results were not obtained in Comparative Examples.

What is claimed is:

1. A metal powder constituted from metal particles, each of the metal particles comprising;
    a base particle having a surface; and
    a metal material constituting at least the surface of the base particle;
    wherein the base particle is subjected to a surface treatment with a fluorine-containing surface treatment agent, and
    wherein the fluorine-containing surface treatment agent has a chemical structure selected from at least one of the following formulas:
    $PO(CF_3(CF_2)_m(CH_2)_l)_n(OH)_{3-n}$, wherein "n" is an integral number of 1 to 3, "m" is an integral number of 2 to 18, and "l" is an integral number of 1 to 18;
    $PO(CF_3(CF_2)_m(CH_2O)_l)_n(OH)_{3-n}$, where "n" is an integral number of 1 to 3, "m" is an integral number of 1 to 3, and "l" is an integral number of 1 to 18;
    $POR_n(OH)_{3-n}$, where "R" is $CF_3(CF_2)_m$-, $CF_3(CF_2)_m(CH_2CH_2O)_l$-, $CF_3(CF_2)_mO$- or $CF_3(CF_2)_m(CH_2)_lO$-, "n" is an integral number of 1 to 3, "m" is an integral number of 2 to 4, and "l" is an integral number of 1 to 18; and $CF_3(CF_2)_5(CH_2)_2O(P)(OH)(OCH_2CH_3)$.

2. The metal powder as claimed in claim 1, wherein at least the surface of the base particle is formed from Al as a major component thereof.

3. The metal powder as claimed in claim 1, wherein the metal particles of the metal powder are of a scaly shape.

4. The metal powder as claimed in claim 1, wherein the "l" is the integral number of 1 to 12.

5. The metal powder as claimed in claim 1, wherein the fluorine-containing surface treatment agent is $CF_3(CF_2)_5(CH_2)_2O(P)(OH)_2$ and $CF_3(CF_2)_5(CH_2)_2O(P)(OH)(OCH_2CH_3)$.

6. The metal powder as claimed in claim 1, wherein an average particle size of the metal particles of the metal powder is in a range of 500 nm to 3.0 µm.

7. The metal powder as claimed in claim 1, wherein an average particle size of the metal particles is in a range of 500 nm to 2.0 µm.

8. The metal powder as claimed in claim 3, wherein an average thickness of the metal particles of the metal powder is in a range of 10 to 70 nm.

9. The metal powder as claimed in claim 1, wherein the metal powder is used to produce an ultraviolet ray curable ink jet composition to be ejected by using an ink jet method.

* * * * *